(12) United States Patent
Völp et al.

(10) Patent No.: US 11,176,256 B2
(45) Date of Patent: Nov. 16, 2021

(54) COMPUTING APPARATUS

(71) Applicant: Université du Luxembourg, Luxembourg (LU)

(72) Inventors: Marcus Völp, Luxembourg (LU); Paulo Esteves-Veríssimo, Luxembourg (LU)

(73) Assignee: Université du Luxembourg, Luxembourg (LU)

( * ) Notice: Subject to any disclaimer, the term of this patent is extended or adjusted under 35 U.S.C. 154(b) by 0 days.

(21) Appl. No.: 17/056,048

(22) PCT Filed: May 17, 2019

(86) PCT No.: PCT/EP2019/062868
§ 371 (c)(1),
(2) Date: Nov. 17, 2020

(87) PCT Pub. No.: WO2019/224127
PCT Pub. Date: Nov. 28, 2019

(65) Prior Publication Data
US 2021/0081535 A1   Mar. 18, 2021

(30) Foreign Application Priority Data
May 22, 2018 (LU) .................................. 100798

(51) Int. Cl.
*G06F 9/44* (2018.01)
*G06F 21/57* (2013.01)
*G06F 9/4401* (2018.01)

(52) U.S. Cl.
CPC .......... *G06F 21/575* (2013.01); *G06F 9/4405* (2013.01); *G06F 2221/034* (2013.01)

(58) Field of Classification Search
CPC . G06F 21/575; G06F 9/4405; G06F 2221/034
See application file for complete search history.

(56) References Cited

U.S. PATENT DOCUMENTS

| | | | | |
|---|---|---|---|---|
| 5,557,739 A | * | 9/1996 | Gupta | ................. G06F 13/4081 |
| | | | | 714/34 |
| 2006/0143454 A1 | * | 6/2006 | Walmsley | ............... G06F 21/85 |
| | | | | 713/170 |

(Continued)

OTHER PUBLICATIONS

International Search Report for PCT/EP2019/062868 dated Jul. 26, 2019.

(Continued)

*Primary Examiner* — Zahid Choudhury
(74) *Attorney, Agent, or Firm* — Dickinson Wright PLLC; Nicholas P. Coleman

(57) ABSTRACT

A capability-based data processing architecture (100) integrating an attesting module (120) are disclosed, together with subroutines for: securing the booting phase of a replicated or unreplicated subsystem (150) of computing units (130, 140) in the architecture and attesting to same; for adding and removing computing units (140) to and from booted systems 150; for relabelling authentication tokens when the booted subsystem (150) comprises computing units; for sealing and unsealing a memory storing data structures that are processed by the other subroutines described herein; and for recovering a booted subsystem (150) beset by faults.

15 Claims, 17 Drawing Sheets

(56) References Cited

U.S. PATENT DOCUMENTS

Figure 1:
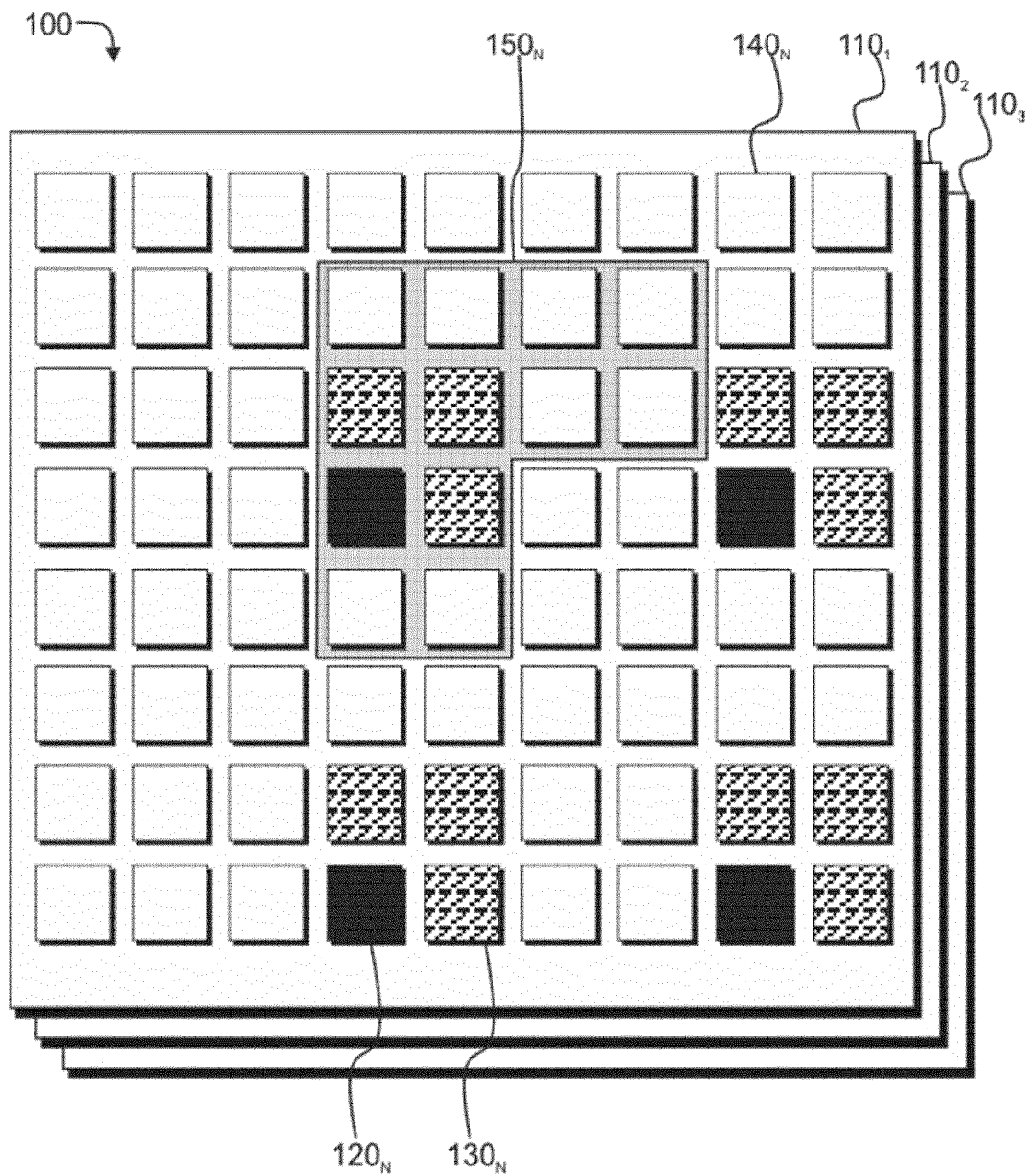

2020/0175168 A1  6/2020  Völp et al.
2020/0234794 A1  7/2020  Esteves-Veríssimo et al.

OTHER PUBLICATIONS

Masti, Ramya Jayaram, et al., "Isolated Execution on Many-core Architectures", International Association for Cryptologic Research, vol. 20140224:033454, Feb. 22, 2014.
Asmussen, Nils, et al., "M3" A Hardware/Operating-System Co-Design to Tame Heterogeneous Manycores, Architectural Support for Programming Languages and Operating Systems, New York, Mar. 2016; pp. 189-203.

* cited by examiner

COMPUTING APPARATUS

This application is the national stage of International Patent Application No. PCT/EP2019/062868 filed on May 17, 2019, which in turn claims priority from Luxembourg Patent Application No. LU100798 filed on May 22, 2018, the disclosures of which are incorporated herein by reference in their entirety.

TECHNICAL FIELD

The present invention relates to secure computing architectures and data processing methods improving the secure booting of such architectures.

BACKGROUND

The same computer or computing resource can execute different software or, in case of devices, firmware implementing different functionality over time. For example, a user may process a banking application on a core, which comprises an example of a computing resource, during online transactions, but re-use this same core for processing a computer game at a later time. The criticality of software depends on the functionality which it provides and the context in which it is used. It is therefore desirable to know which software is processed by a computing resource at a given point in time. Referring again to the banking application example, a user may wish to reveal sensitive financial and/or personal data only if and when the banking application is being processed, but not at the later time when the computer game has taken over control of the core. Various technologies have been developed to authenticate the software that runs on a system. However, these are limited to a fixed and unchangeable root of trust and they assume correctness of the entire fata processing platform when it comes to isolating different software components.

Hardware capability-based systems are a solution to address this concern, through the isolation of individual computing resources, even in the presence of a limited set of hardware faults. A "capability" is a token used to grant or restrict access to a computing resource in a computing system, which implements capability-based security. The capability comprises at least a pointer and a set of rights. The pointer comprises a value, which points to an object, and the rights associated with the pointer govern an application's access to that object. A capability may further comprise an authentication token, which encodes the expected software or firmware component corresponding to the resource referred to by the pointer, wherein such capabilities are termed labelled capabilities. Capabilities with authentication tokens grant access to an application, only if the authentication token in the capability matches the resource provider at the computing resource to which the capability refers, i.e. that which holds the object to which the capability points.

In a capability-based system, the possession of a capability with sufficient rights is both necessary and sufficient to access the resource to which the capability points. A capability c=(ptr,perm,I,auth) is an unforgeable token consisting of the pointer ptr to a resource r, a set of access rights R and optionally a label I and authentication token auth. The owner of that capability may perform an operation op on the referenced resource r, provided that perm contains an access right which authorizes op. For example, to modify a region of physical memory referenced by a capability c, the set c.perm of this capability must contain corresponding write permissions, for instance expressed as w∈c.perm. The label I is an application-provided value, which is stored in the capability and which is passed to the resource as an additional parameter, when the capability is invoked to perform an operation. Authentication tokens authorize access only if the numerical representation of the resource-providing subsystem matches auth.

In capability-based platforms which facilitate multiple and functionally-rich operating systems ("OSs"), but wherein such OSs are complex and so potentially error-prone and vulnerable, environments which provide execution with improved trustworthiness are called enclaves. With such platforms, conventionally a management OS is first started when the platform boots, and is responsible for starting and managing resources of all of enclaves, applications and other isolated rich OSs. That is, the platform boots in an untrusted way then has to establish trust in the enclaves and the code executing therein.

For remote users of such platforms to trust in the integrity and security of applications running in enclaves, the platform must provide applications with a means to attest that they run in a secure set-up. Since the management OS starts first at booting time, this guarantee must be established as part of the late launch of the enclave. The state-of-the-art for authenticating the secure boot of an enclave consists of protocols implemented in a trusted platform module ("TPM") respectively in an Intel® provided enclave in SGX®. This special Intel® enclave is booted securely, namely because only Intel-signed code can be processed successfully, and extends this boot guarantee by measuring the application to-be-booted. The proof of the authenticated-boot process is thereby provided by the boot enclave, through the TPM signing a message which contains the identity of the booted code (e.g. a hash) and a nonce provided by the remote user to prevent replay attacks.

However, a fundamental limitation of these platforms and solutions is the inherent assumption that tile hardware is always correct: the correctness of any form of attested boot hinges on the correctness of its root of trust, anchored in the boot module. In the example case of a late launch of subsystems, this approach implies correctness of the encryption algorithm used to attest the boot or, alternatively, of the key generation algorithm used to equip the subsystem with key material, with the help of which it can report the boot on its own. Any compromise of the attestation module, any leakage of the embedded key material, and/or a vulnerability in the built-in cipher, therefore entails the risk of adversaries being able to spoof a boot certificate, which undermines the security of the platform. The increasing complexity of hardware building blocks thus nullifies the scope of the inherent assumption that tile hardware is always correct, particularly when known TPM solutions provide little to no updateability of the root of trust and when TPM complexity hinders large-scale integration and replication. These disadvantages are particularly acute in the context of systems designed with a lifespan of several decades.

The above considerations are compounded by the ordinary occurrence of faults in components of a system that may either crash silently or exhibit arbitrary, i.e. "Byzantine", behaviour, which other components may interpret as inputs. Byzantine Fault Tolerance ("BFT") protocols, such developed by M. Castro and B. Liskov ("*Practical byzantine fault tolerance*" in 3rd Symposium on Operating Systems Design and Implementation. New Orleans, USA: ACM, February 1999) and by G. S. Veronese et al ("*Efficient byzantine fault-tolerance*" IEEE Trans. Comput., vol. 62, no. 1, pp. 16-30, January 2013), provide tolerance mechanisms for such behaviour, which prevent the interpretation of a minority of responses as a valid answer. These tolerance mechanisms rely upon the presence of replicated components wherein, when f is a configurable number of simultaneously present faults or component compromises that a system should tolerate, then BFT protocols ensure that a majority of at least f+1 replicas will eventually reach agreement on the request to be processed, and on the response given to this request. For that purpose, BFT protocols need a number n=3f+1 or n=2f+1 replicas, respectively, in the absence or presence of trusted-trustworthy components that prevent certain faulty behaviour. For example, the trusted-trustworthy universal sequence and identity generator ("USIG") in MinBFT allows replicas to verify that message ordering is contiguous and monotonic: the USIG signs and returns the hash of a message together with a cryptographically-protected counter value, which it increments for each message.

Accordingly most known securing solutions depend on the correctness of the processor cores which execute operating-system and enclave code to convey the desired security guarantees. But the boot process of these systems and, in particular, the method of attesting the creation of more trustworthy subsystems, reports about the platform in its entirety, and is therefore incapable of distinguishing trust at the level of individual tiles. Faulty tiles are therefore reported to the same level of assurance as correct ones or hardened ones, and software is incapable of proving to its users that it has relocated to a different set of tiles after having suspected a tile to be faulty.

An alternative solution for securing the booting phase of a platform and attesting the security of the boot is thus required, for mitigating at least some of the above-described disadvantages.

SUMMARY

A module, an architecture incorporating the module and data processing methods are provided according to the present invention, which collectively improve over state-of-the-art authenticated boot technology in several ways: by providing hardware and methods for authenticating the boot of a system or the late launch of a subsystem whereby the root of trust may change over time; by developing a booting method for capability and labelled-capability systems that allows constructing and using a more trustworthy subsystem from a less trusted one through the same capabilities; and by extending corresponding methods to boot replicated subsystems in such a way that a system immediately benefits from the subsystem's replication degree, and is able to reach consensus even if a limited number of replicas are faulty or have been compromised.

According to a first aspect of the invention therefore, there is provided a module in a capability-based computing and/or data processing architecture, comprising: storage means for storing a plurality of data structures and a first set of instructions, wherein a first data structure comprises a first data sequence representative of a booted subsystem, the subsystem comprising at least three computing units in the architecture, each computing unit comprising at least one computing resource; a second data structure comprises a set of at least one capability passed to a subsystem to boot; and a third data structure comprises a second data sequence representative of a configuration of the subsystem to boot and a set of booting instructions; the module further comprising computing means configured by the first set of instructions to compute the first data sequence based on the stored second data sequence, the stored set of booting instructions and the stored capability set; reset and stall each computing unit of the subsystem; copy the stored capability set, the second data sequence and the stored set of booting instructions to a memory resource of the stalled computing unit; change an identifier of the stalled computing unit to the computed first data sequence, then allow the stalled computing unit to resume booting; and the module further comprising interfacing means for operably interfacing the module in data communication with computing units of the architecture.

In an embodiment of the module, the storage means may further store a data structure representative of a current configuration of cores comprised in the booted subsystem. In a variant of this embodiment, the storage means may further store a data structure representative of a history of configuration of cores previously comprised in the booted subsystem. In a further variant of either of these embodiments the storage means may further comprise a non-volatile memory for storing one or more sets of computed first data sequence and capability set respectively of one or more previously-booted subsystems.

In an embodiment of the module, the storage means may further store at least one random value passed to the module by a quote-requesting system to prevent replay, and data representative of a proof of secure boot computed for the at least one random value.

In an embodiment of the module, the architecture may further comprise authentication tokens, and wherein at least one authentication token is set to the first data sequence. In a variant of this embodiment, the initial set of at least one capability may be divided into a number of subsets, each subset having a respective identifier (i) for identifying a respective replica of each computing unit in the subsystem, whereby the module and computing units of the subsystem are replicated in the architecture. In a variant of this further embodiment, the architecture may further comprise at least one voter module and wherein operations of the or each replica of the booted subsystem are voted upon by channelling operation proposals of a first module replica to the or each remaining module replica(s).

In an embodiment of the module, the module may further comprise a tamperproof protected storage area storing data and a reconfigurable logic for updating the module. In a variant of this embodiment, the protected storage area may comprise a first non-volatile memory storing a plurality of cryptographic keys for validating and decrypting an update for the first set of instructions and a second non-volatile memory storing a plurality of cryptographic keys for updating, attesting and booting the attestation module. In a variant of this further embodiment, the first non-volatile memory may further store a first circuit area corresponding to an updated circuit for the reconfigurable logic, the second non-volatile memory further stores a second circuit area corresponding to a definition of the reconfigurable logic, wherein the second circuit area is swappable with the first circuit are. In these embodiments, the reconfigurable logic may advantageously comprise one or more selected from lookup tables, routers and other FPGA building blocks and a part of the computing module.

According to another aspect of the invention, there is also provided a capability-based computing and/or data processing architecture comprising at least one subsystem to boot, the or each subsystem to boot comprising at least three computing units, each computing unit comprising at least one computing resource, wherein at least one computing unit in the or each subsystem comprises an embodiment of a module as hereinabove described, and wherein the architecture comprises a network-on-a-chip, is provided on a chip, and/or comprises an integrated chip (IC) or microprocessor. Such an architecture may preferably be embodied in a multi-core or many-core data processing apparatus.

According to a further aspect of the invention, there is also provided a capability-based computing and/or data processing architecture comprising at least one subsystem to boot, the or each subsystem to boot comprising at least three computing units, each computing unit comprising at least one computing resource; wherein at least one computing unit in the or each subsystem comprises a module operably interfaced with other computing units of the subsystem; wherein the module comprises a storage resource for storing a first set of instructions and a plurality of data structures including a first data structure comprising a first data sequence representative of a booted subsystem, a second data structure comprising a set of at least one capability passed to a subsystem to boot, and a third data structure comprises a second data sequence representative of a configuration of the subsystem to boot and a set of booting instructions; wherein the module further comprises a computing resource configured by the first set of instructions to compute the first data sequence based on the stored second data sequence, the stored set of booting instructions and the stored capability set; reset and stall each computing unit of the subsystem; copy the stored capability set, the second data sequence and the stored set of booting instructions to a memory resource of the stalled computing unit; change an identifier of the stalled computing unit to the computed first data sequence, then allow the stalled computing unit to resume booting. Embodiments of this architecture may comprise embodiments of the module substantially as hereinbefore described and so inherit their respective advantages.

Embodiments of architectures introduced and described herein may usefully be embodied in a multi-core or many-core data processing apparatus.

According to yet another aspect of the invention, there is also provided a data processing method for booting a subsystem comprising at least three computing units in a capability-based computing and/or data processing architecture, each computing unit comprising at least one computing resource, at least one computing unit in the subsystem comprising a module operably interfaced with other computing units of the subsystem, the method comprising the steps performed at the module, of storing a first set of instructions; storing a first data structure comprising a first data sequence representative of the booted subsystem; storing a second data structure comprising a set of at least one capability passed to the subsystem to boot; storing a third data structure comprising a second data sequence representative of a configuration of the subsystem to boot and a set of booting instructions; computing the first data sequence based on the stored second data sequence, the stored set of booting instructions and the stored capability set; resetting then stalling each computing unit of the subsystem; copying the stored capability set, the second data sequence and the stored set of booting instructions to a memory resource of the stalled computing unit; changing an identifier of the stalled computing unit to the computed first data sequence; and allowing the stalled computing unit to resume booting.

An embodiment of the method may comprise the further steps of storing a fourth data structure representative of a current configuration of cores comprised in the booted subsystem; storing a fifth data structure comprising at least one random value received from a quote-requesting system to prevent replay; and generating a signature from the at least one random value, the fourth data structure and the computed first data sequence, wherein the signature attests to the secure booting of the subsystem.

An embodiment of the method may comprise the further steps of storing a data segment for processing by the set of booting instructions; containing a computing unit replica identifier in the data segment; computing a third data sequence based on the computed first data sequence and the stored identifier; wherein the step of storing the second data structure further comprises dividing the capability set into at least two subsets; wherein the step of changing the identifier of each stalled computing unit further comprises changing the identifier to the computed third data sequence ; and wherein the step of copying the stored capability set further comprises storing at least one capacity subset with a respective computing unit replica identifier to the memory resource of each stalled computing unit.

A variant of this embodiment may comprise the further steps of polling each computing unit replica of the booted subsystem (150) with a voter module (1110); and reserving the step of allowing the stalled computing unit to resume booting upon reaching a quorum of computing unit replica votes. A variant of this further embodiment may comprise the further steps of reserving the step of generating the signature attesting to the secure booting of the subsystem upon reaching a quorum of computing unit replica votes.

According to still further aspects of the invention, there are also provided data processing methods of adding and removing a computing unit to a subsystem booted according to any of the booting method embodiments introduced hereinabove ; a method of relabelling each computing unit in a subsystem likewise booted according to any of the booting method embodiments introduced hereinabove ; method of securing and releasing a non-volatile memory of the module in a subsystem booted according to embodiments of the booting method using replicas ; and a data processing method for recovering a subsystem booted according to embodiments of the booting method using replicas.

Still other aspects of the invention also provide for a computer readable storage medium for storing computer readable instructions, and for a computer program or computer program product comprising software code, wherein the computer readable instructions are adapted to implement and the software code is adapted to perform the steps of the method described herein and as claimed in the appended claims.

BRIEF DESCRIPTION OF THE DRAWING FIGURES

Figure 2:
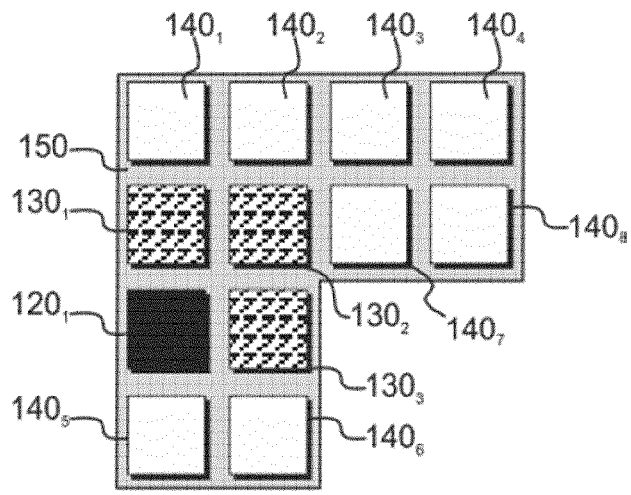
Figure 3:
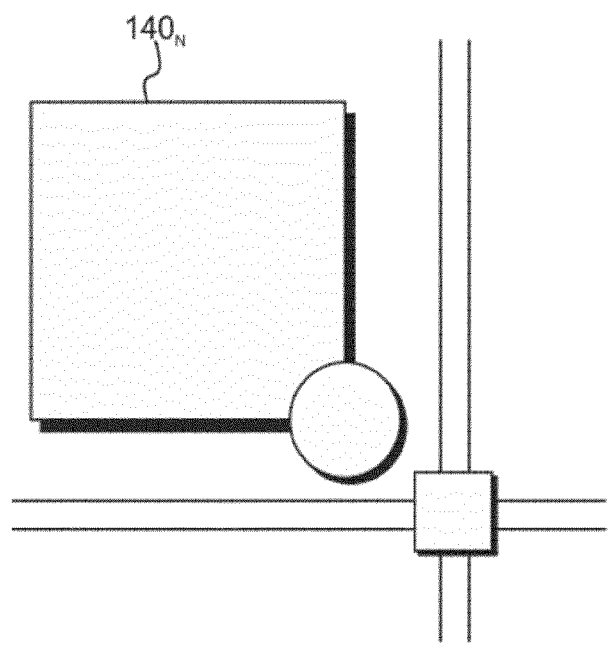
Figure 4:
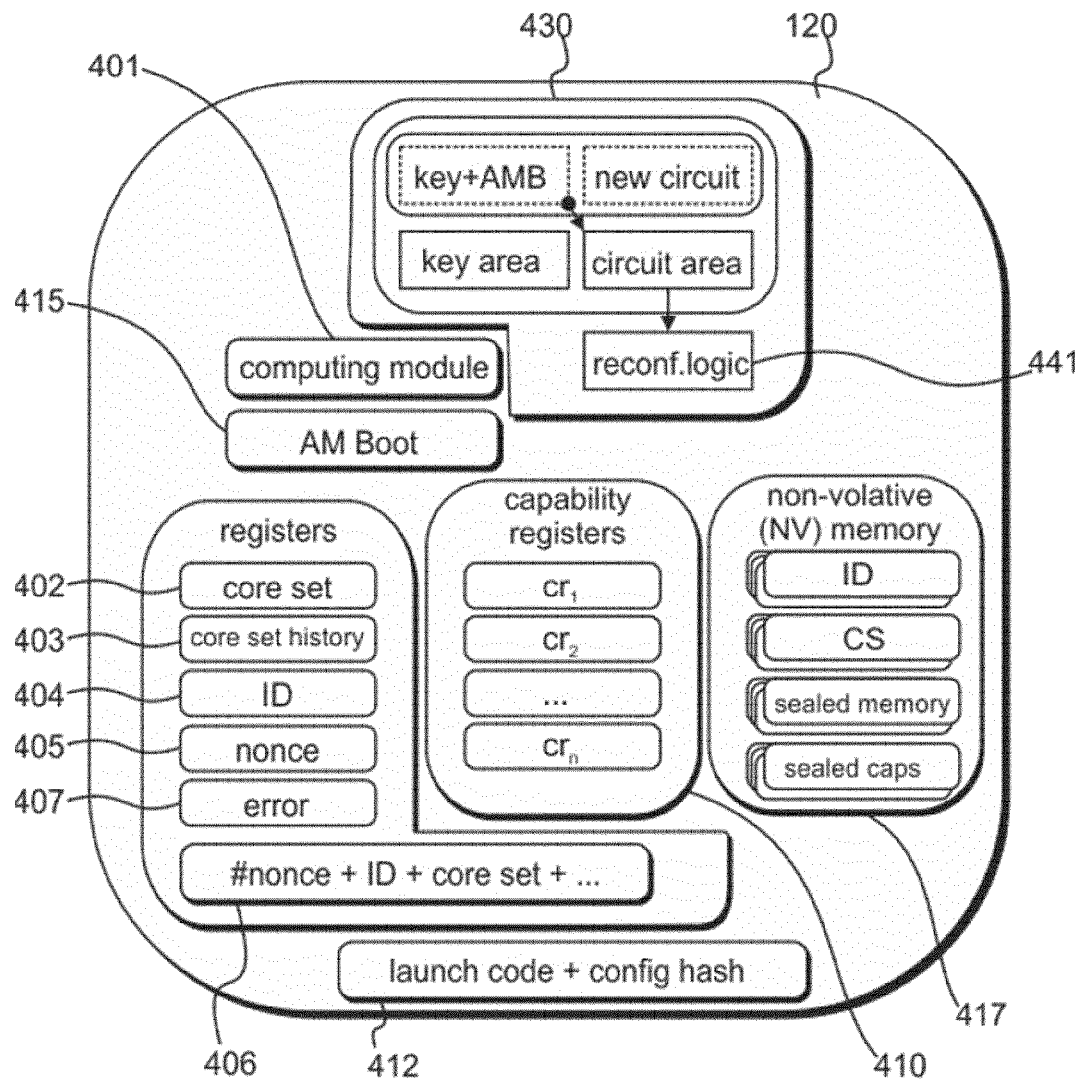
Figure 5:
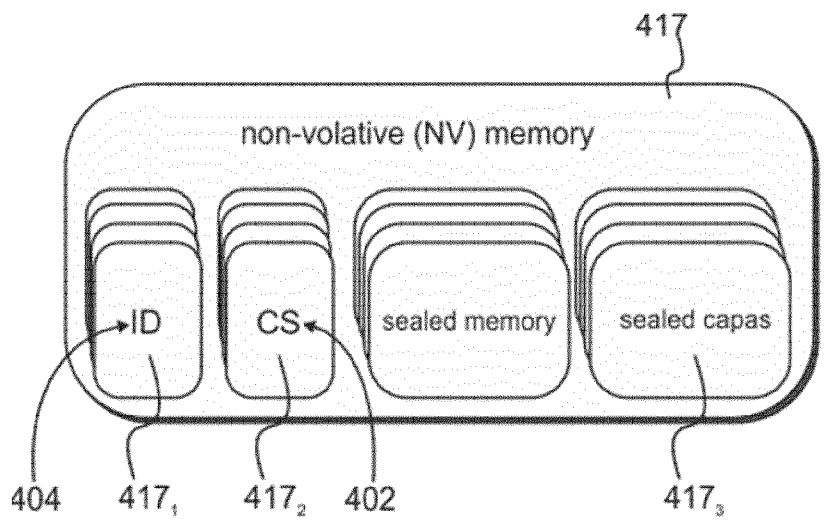
Figure 6:
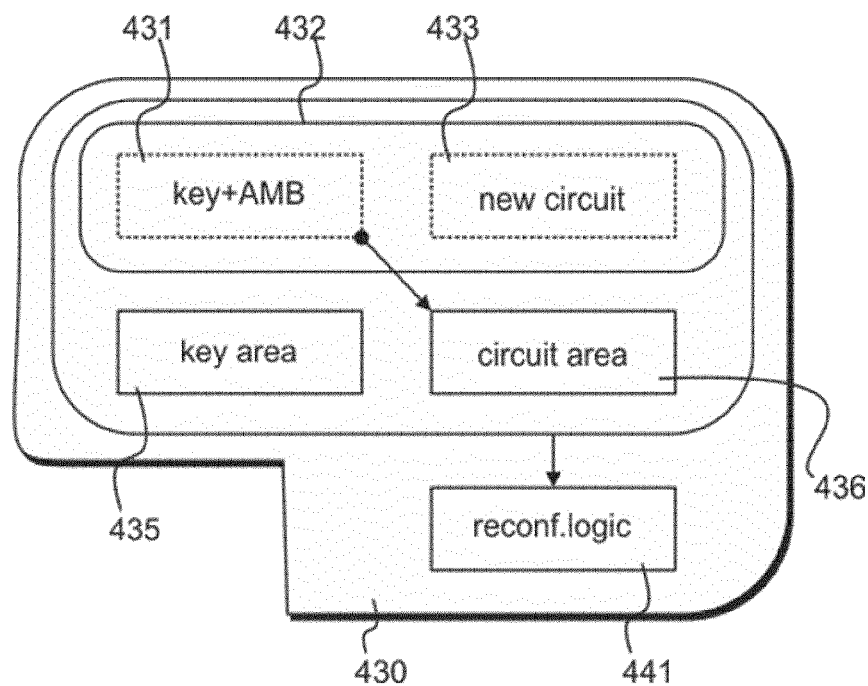
Figure 7:
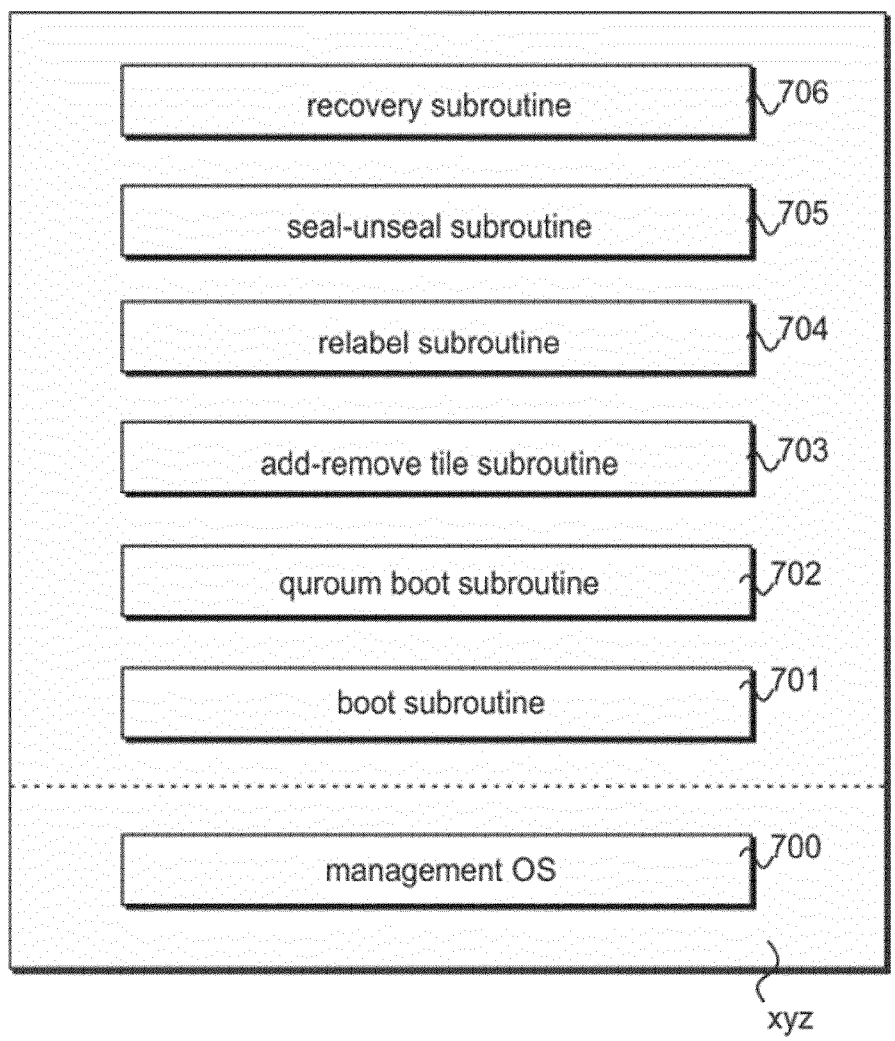
Figure 8A:
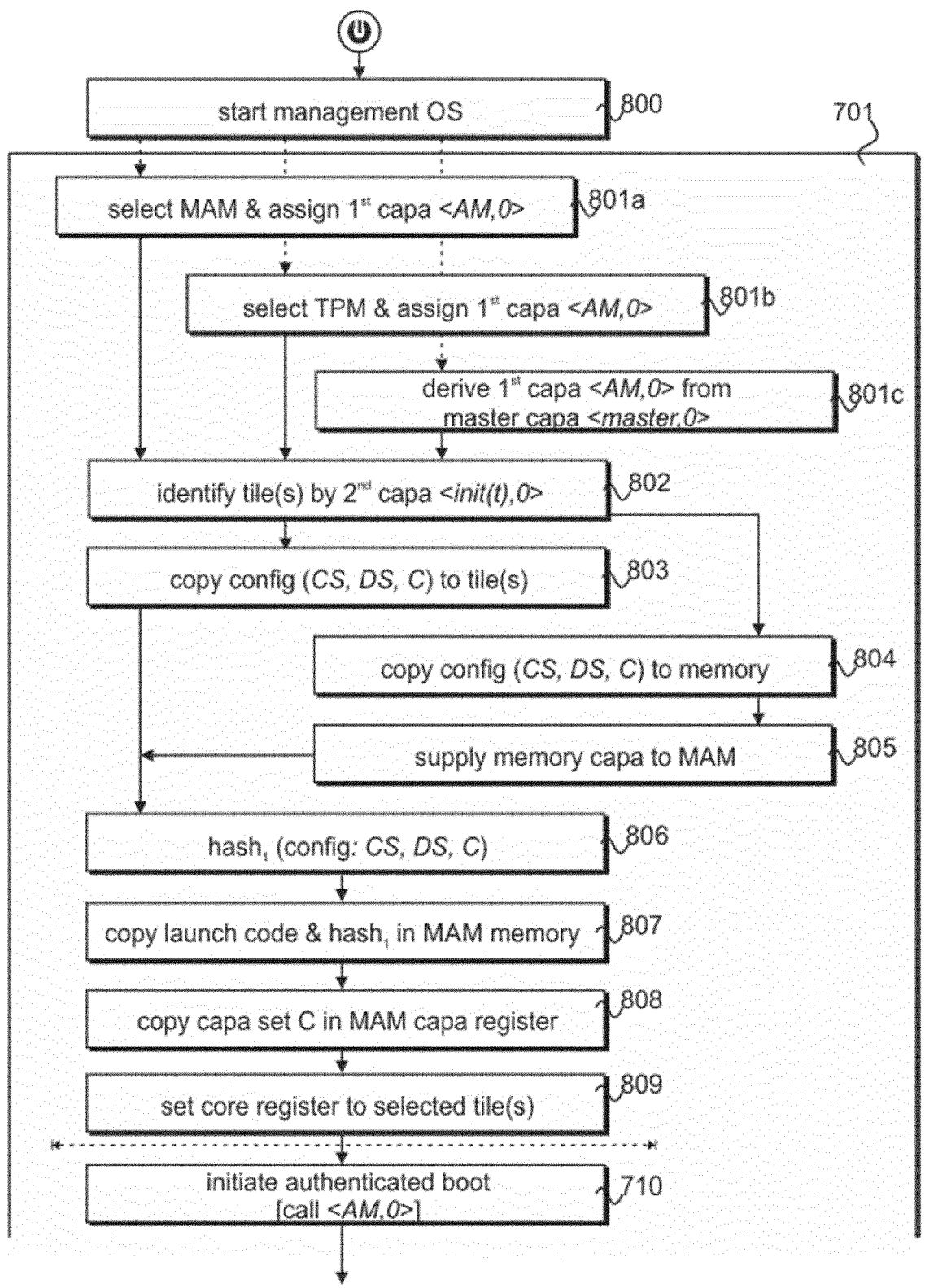
Figure 8B:
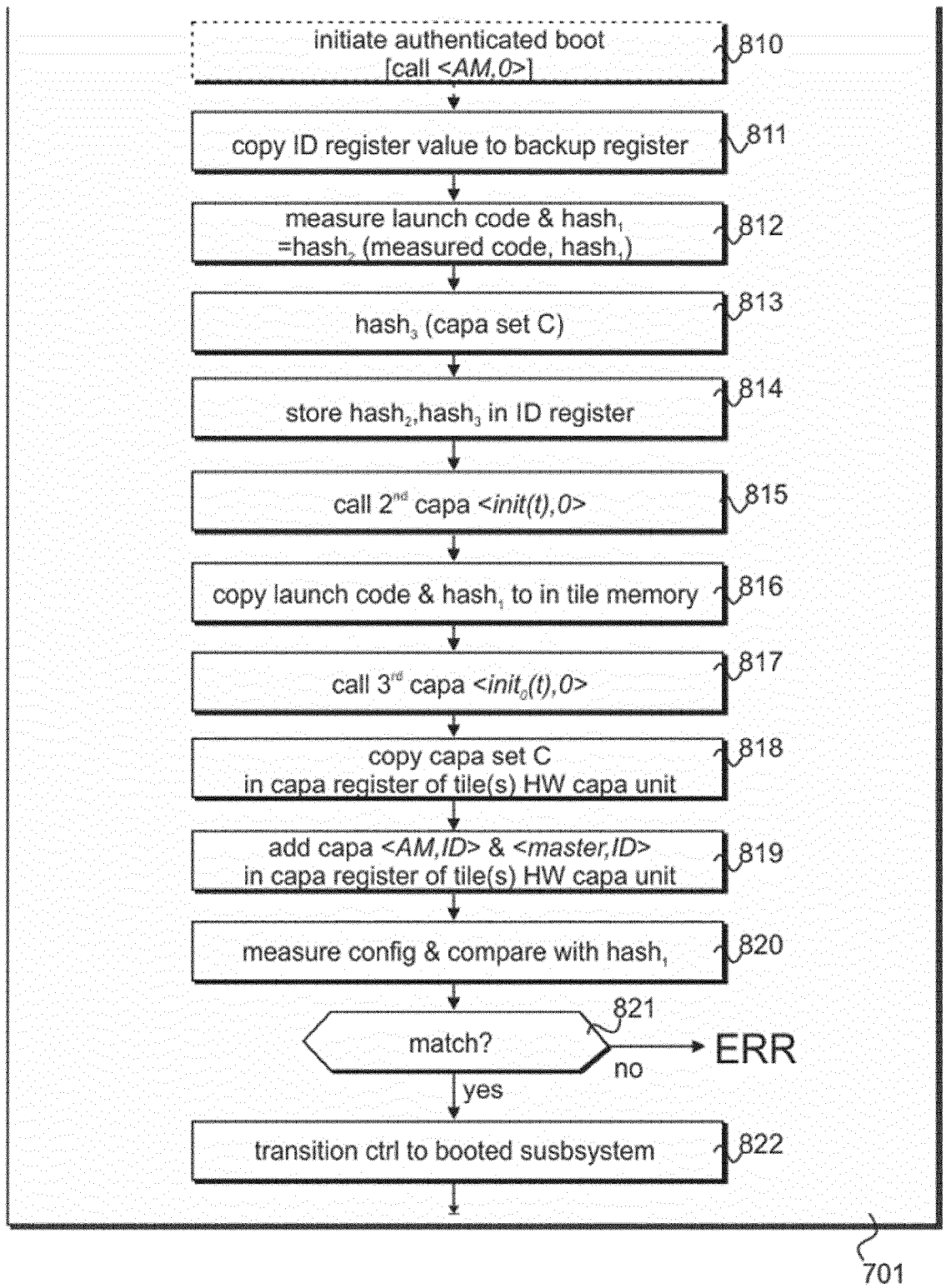
Figure 9:
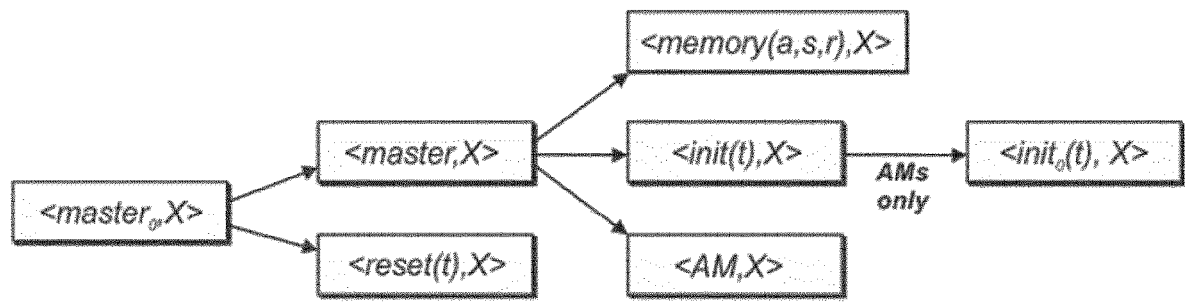
Figure 10:
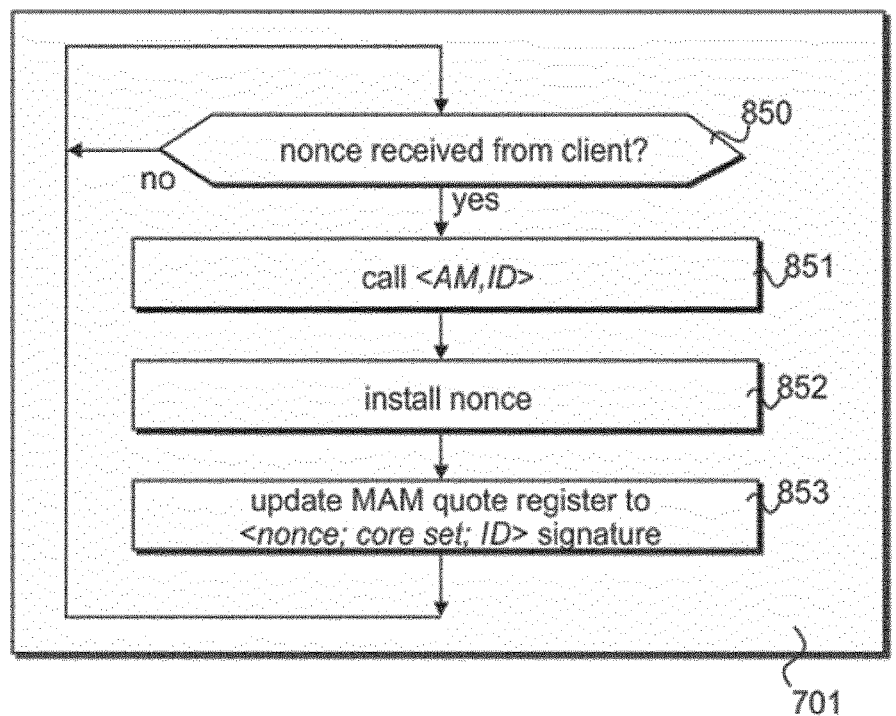
Figure 11:
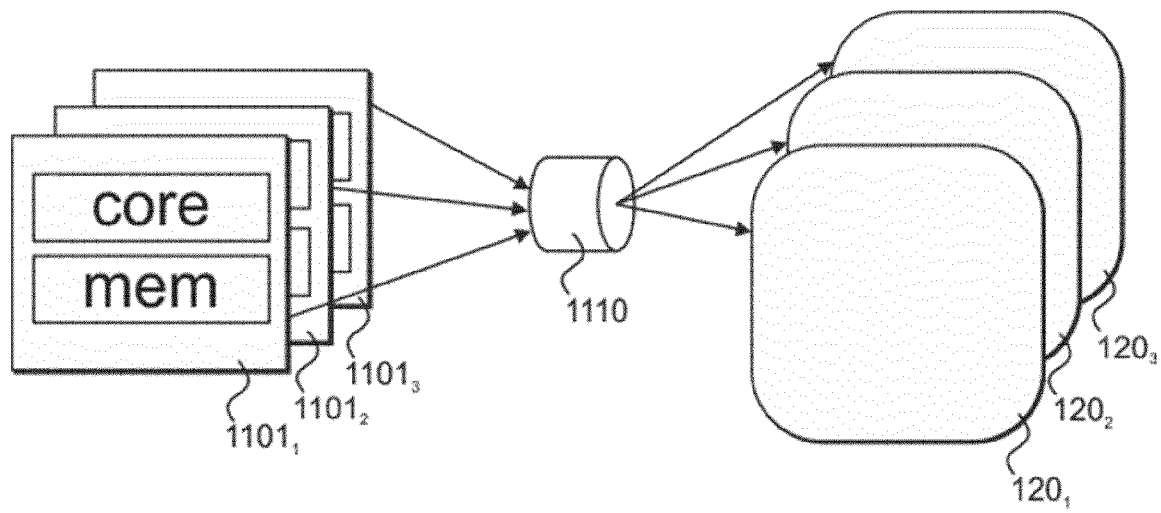
Figure 13B:
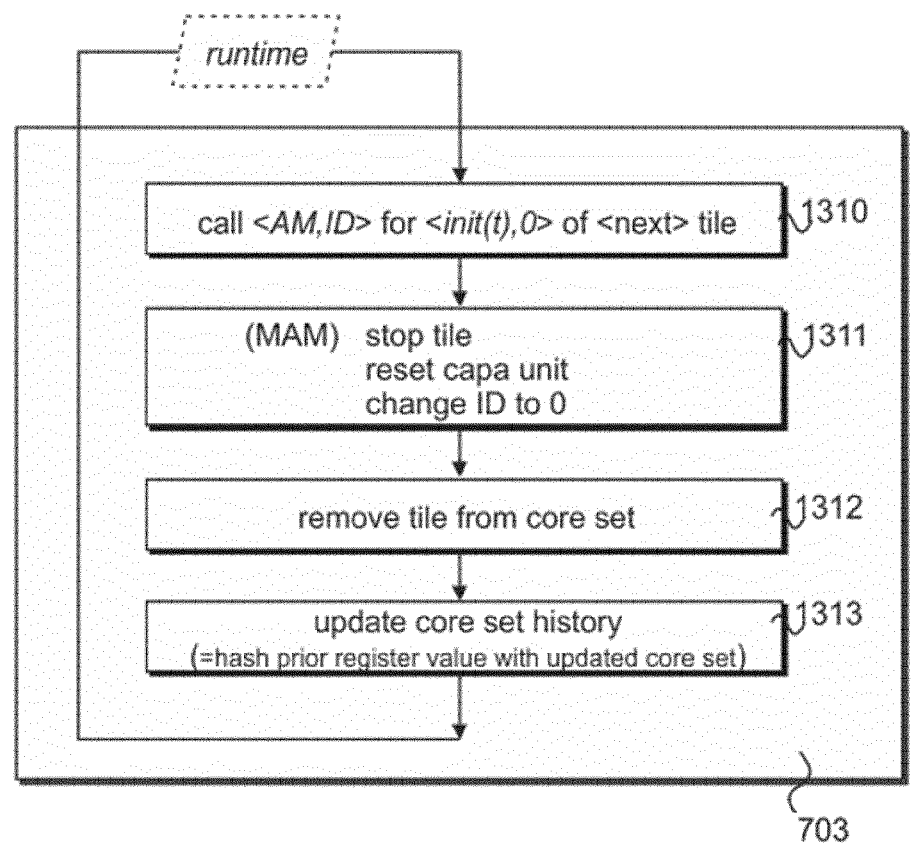
Figure 12:
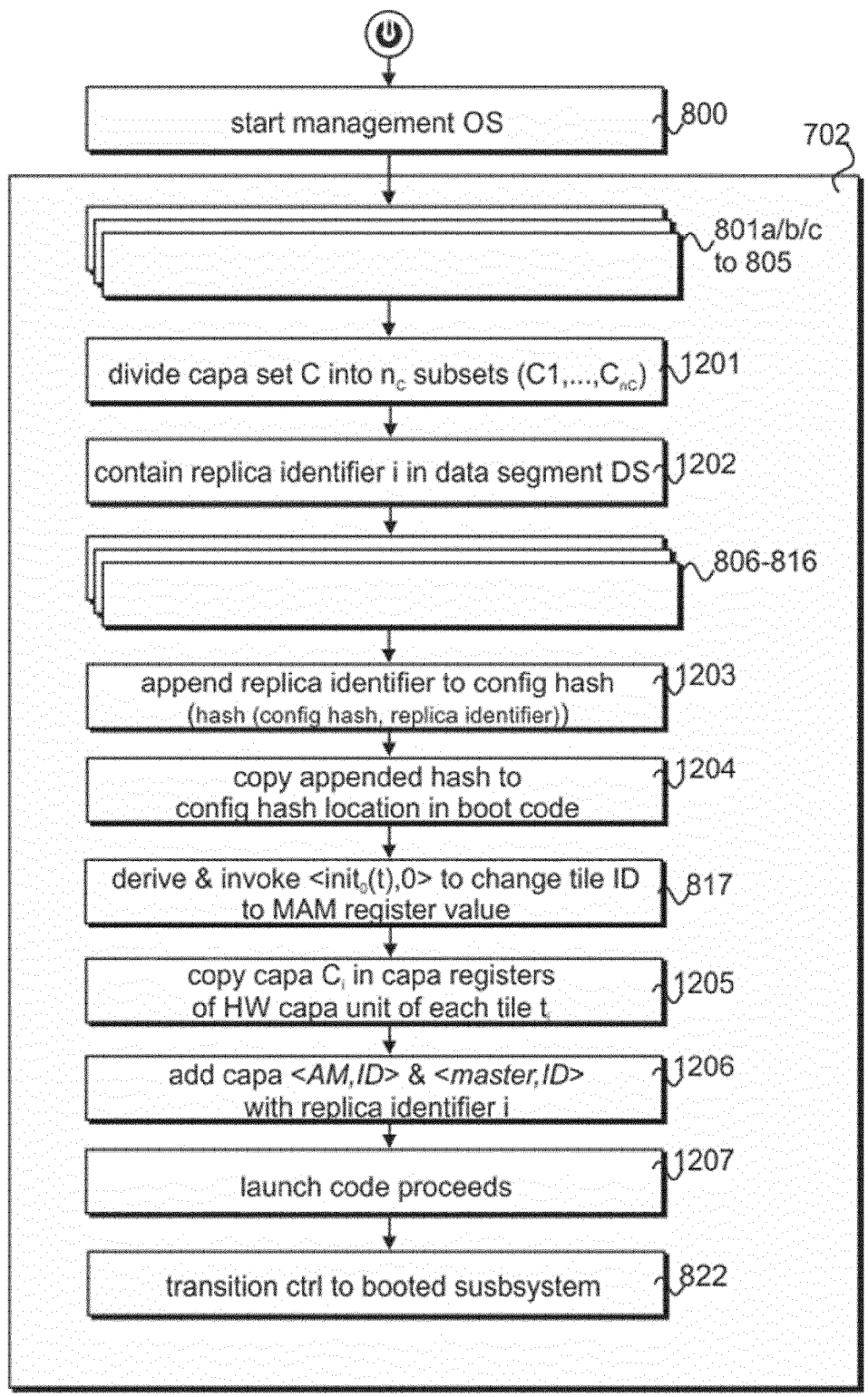
Figure 13A:
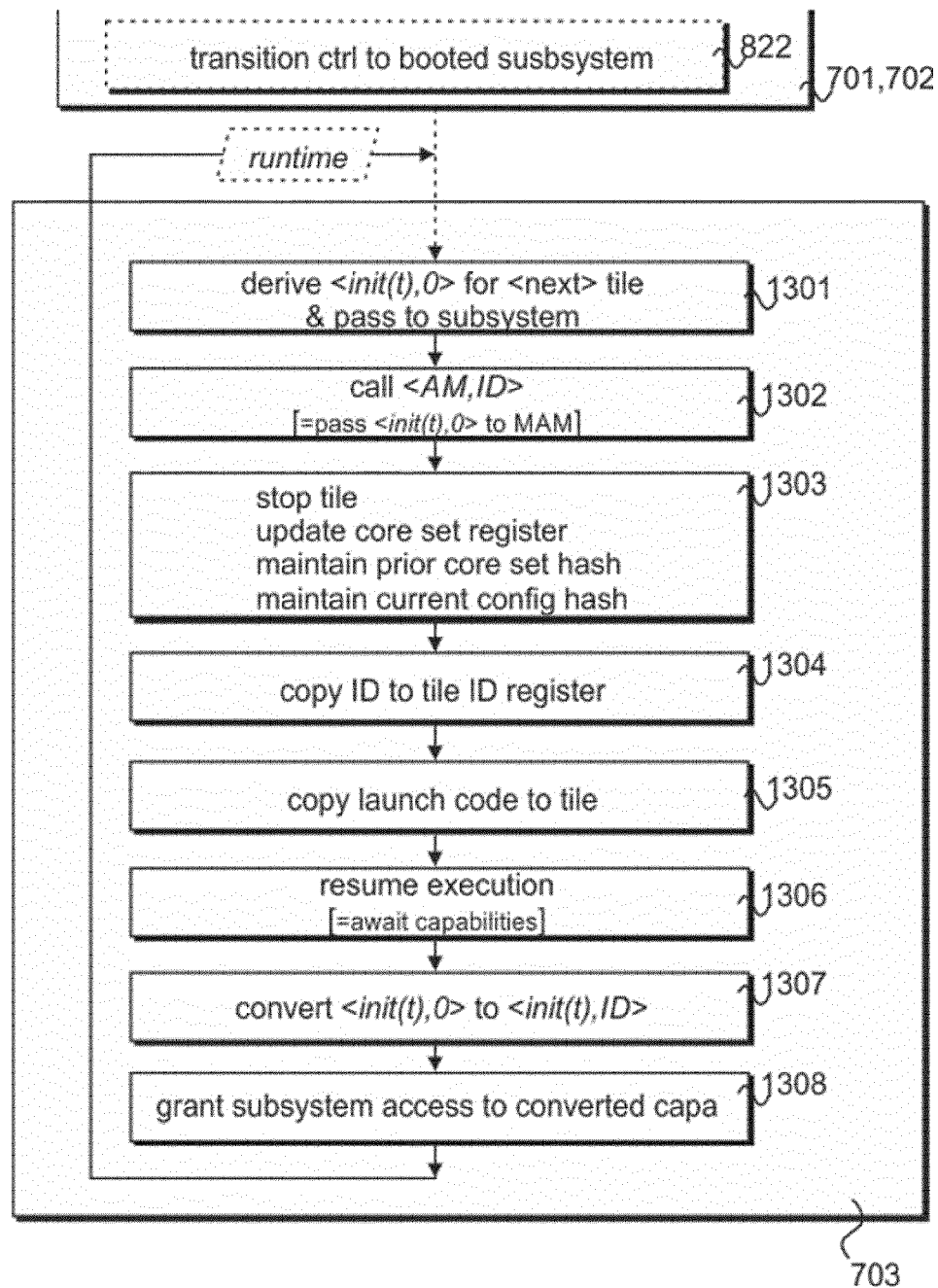
Figure 14:
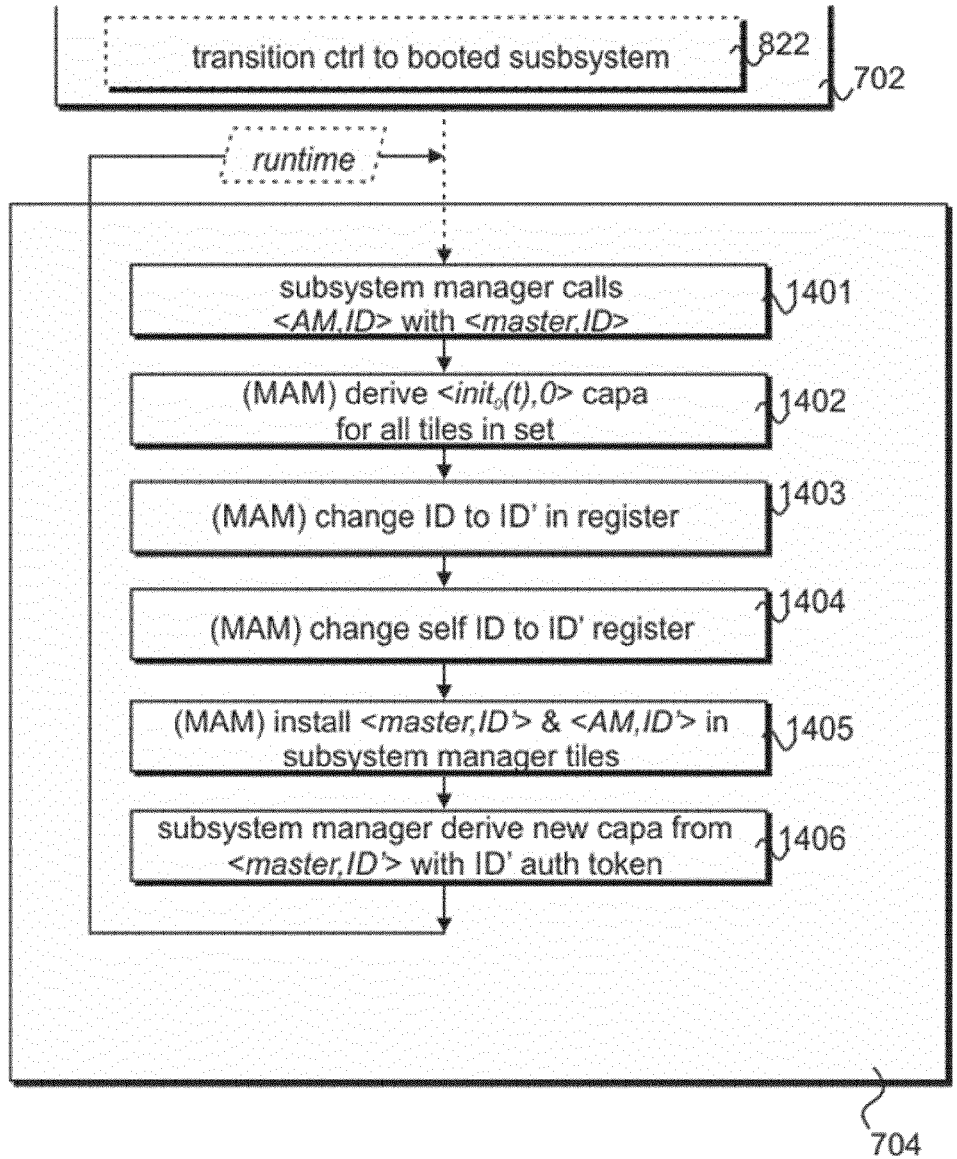
Figure 15A:
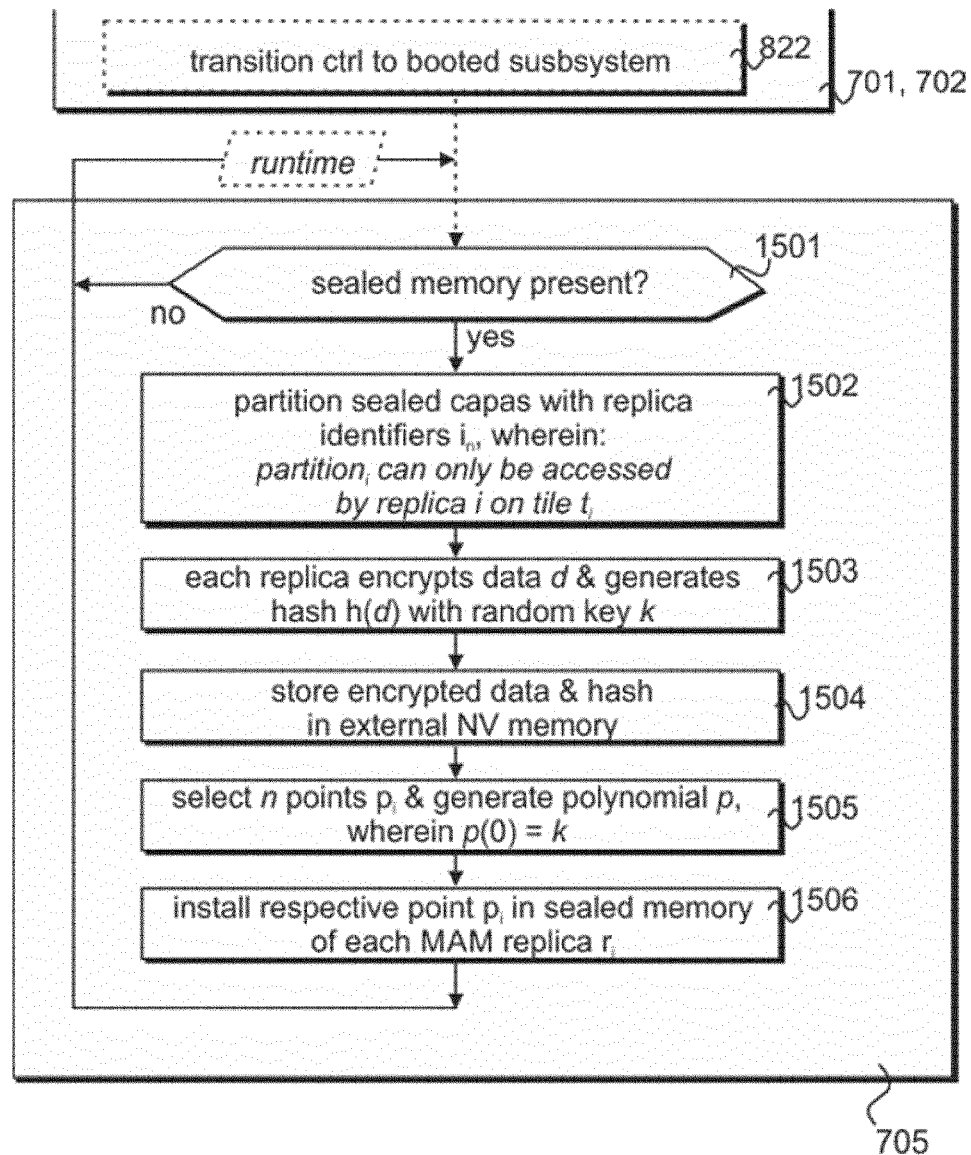
Figure 15B:
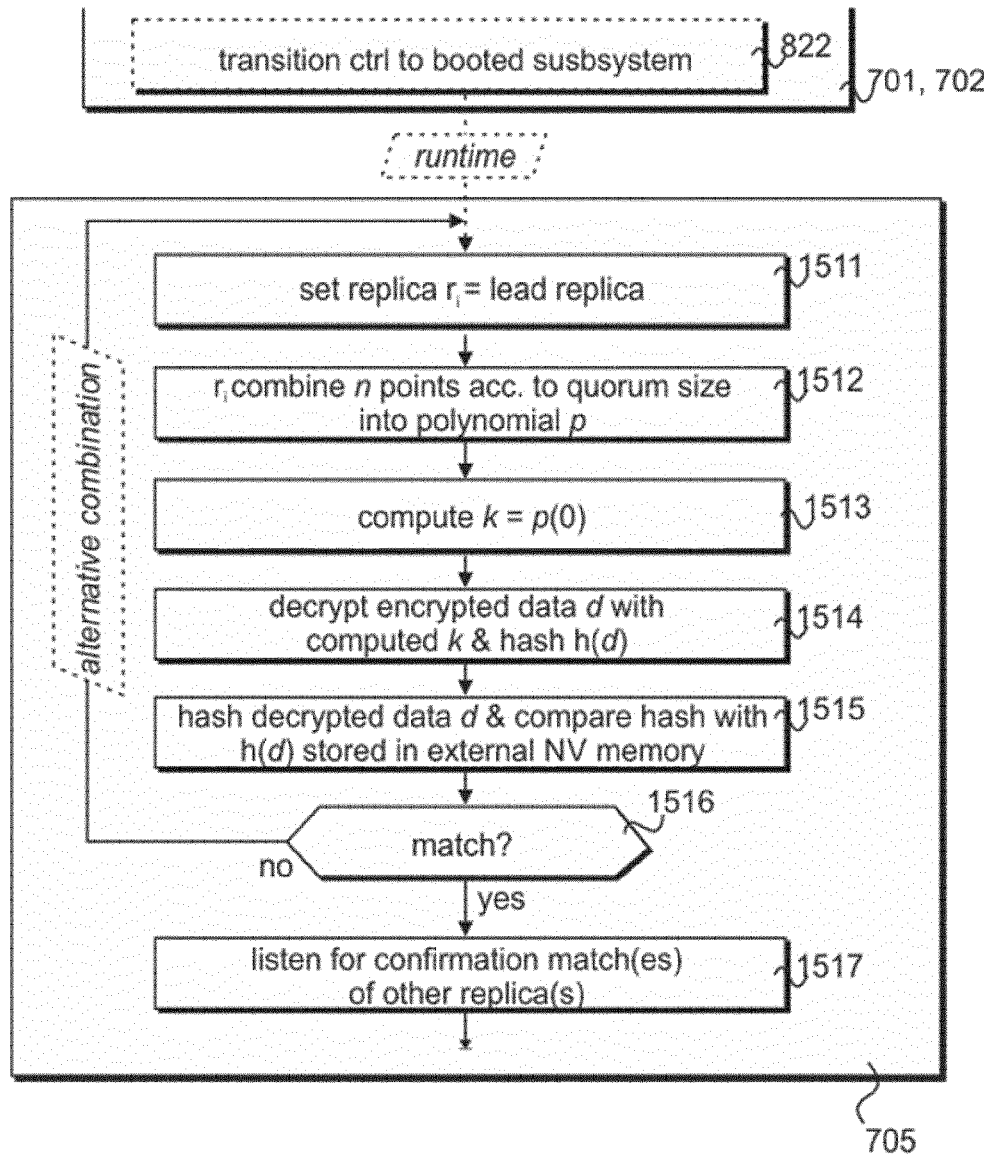
Figure 16:
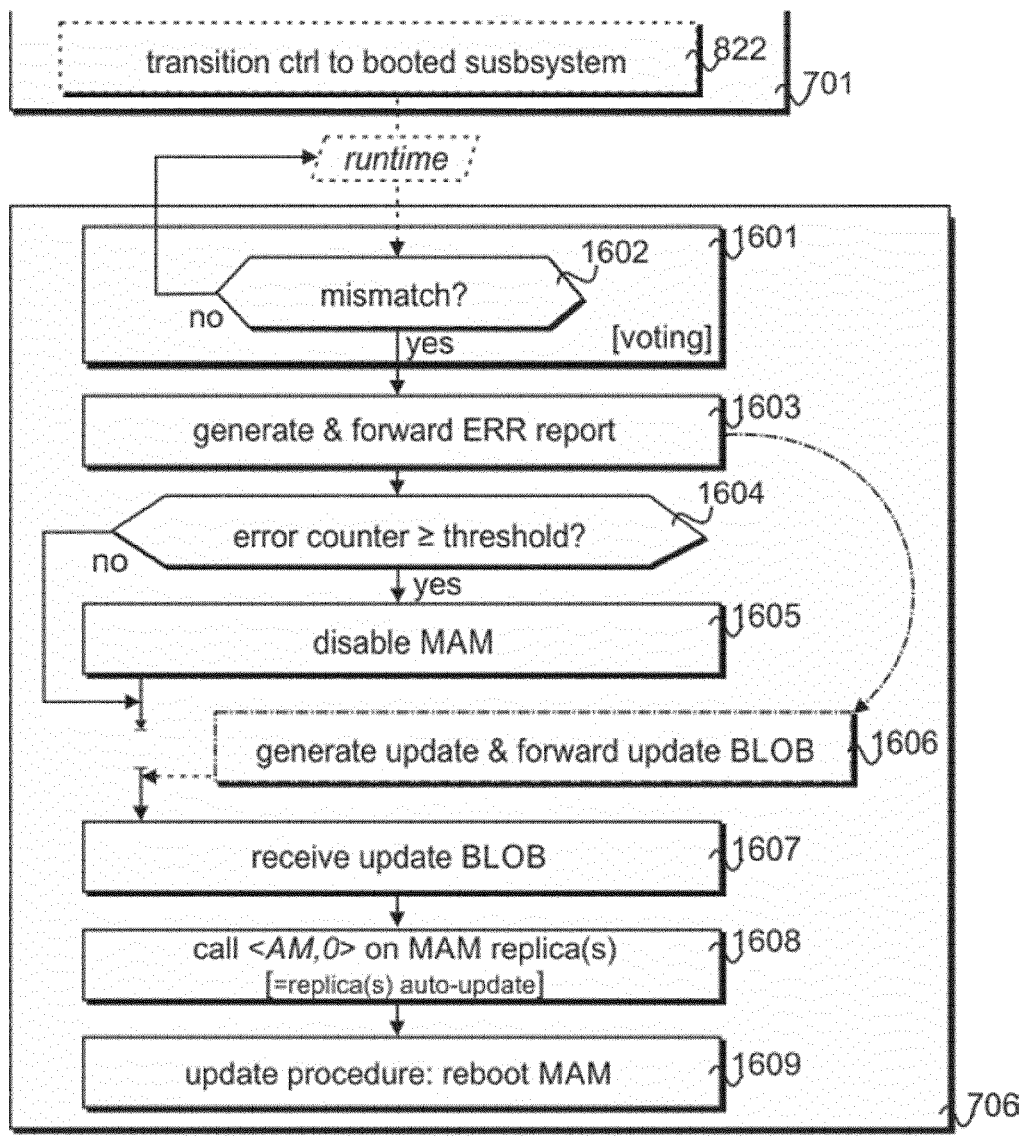
Figure 16:
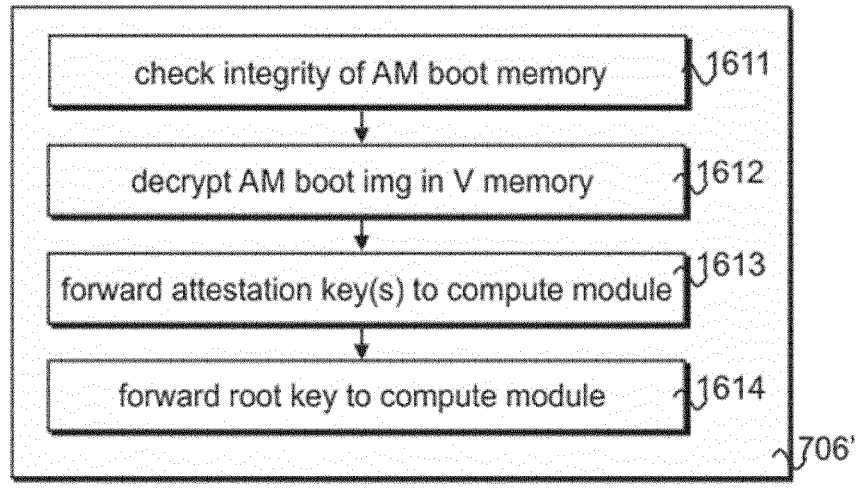
Figure 17:
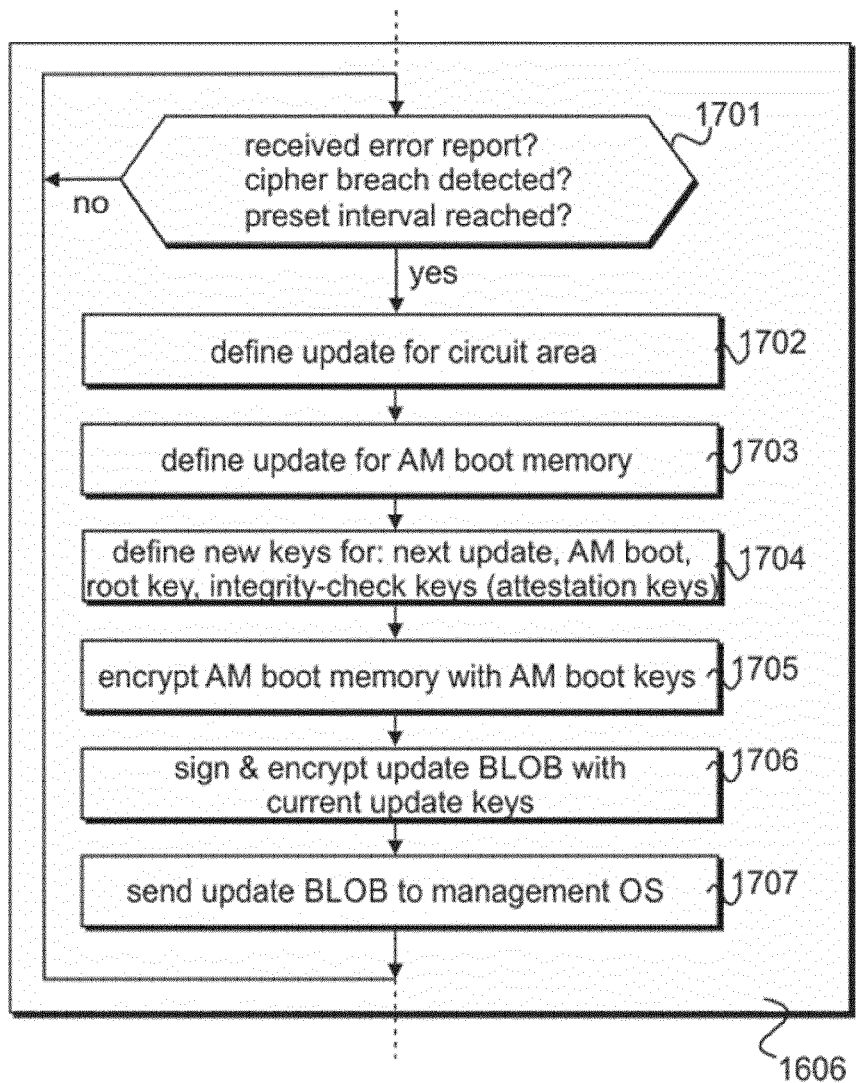
Figure 18:
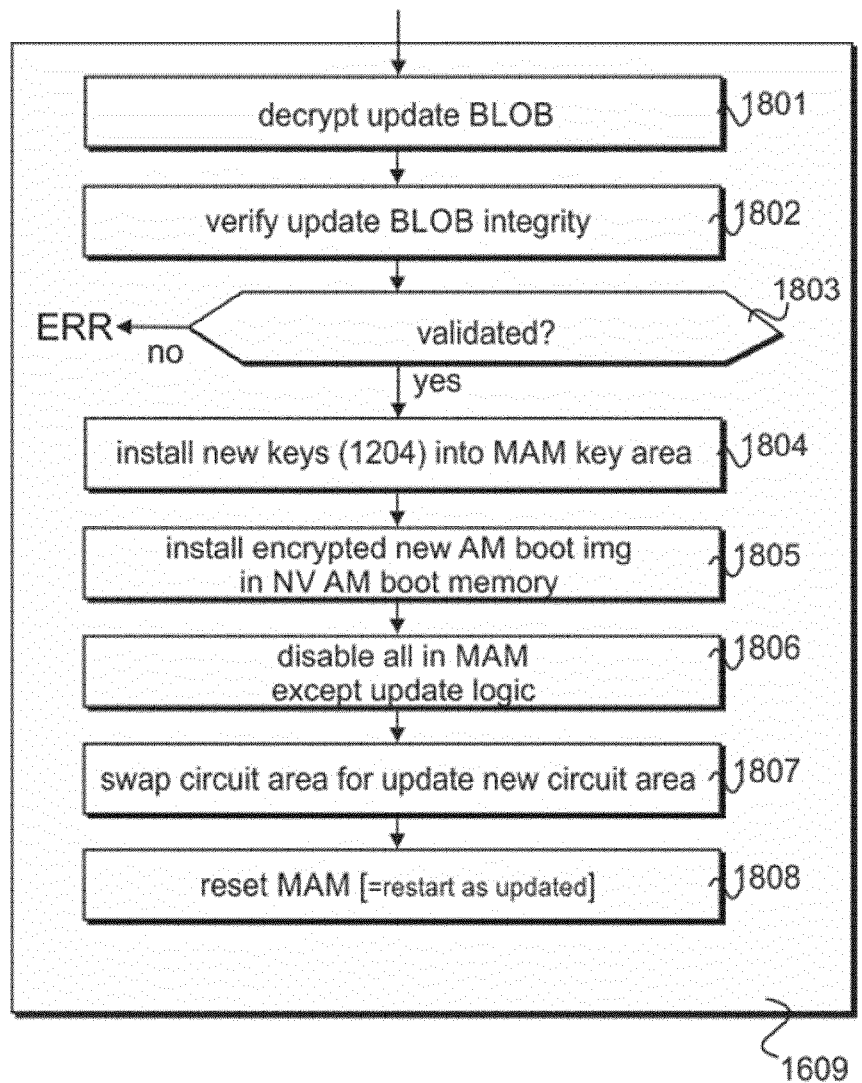

Embodiments of the present invention will now be described by way of example only, with reference to accompanying drawings, which are:

FIG. 1 an example of a data processing architecture including a plurality of tiles, a plurality of-attestation modules and an example subsystem according to an embodiment of the invention;

FIG. 2 the subsystem of FIG. 1, comprising at least one-attestation module and a subset of tiles;

FIG. 3 a detail of the interconnect of a tile in FIGS. 1 and 2;

FIG. 4 an embodiment of a attestation module of FIGS. 1 and 2, including an ultra high protected area and a non-volatile memory;

FIG. 5 a detail of the ultra high protected area of FIG. 4;

FIG. 6 an example of data structures stored in the non-volatile memory of FIG. 4;

FIG. 7 data processing methods embodied as respective logic blocs processed in the architecture of FIGS. 1 to 6;

FIG. 8A a sequence representing a first portion of a data processing method referenced in FIG. 7, for processing an autheticated boot of the subsystem in FIGS. 1 to 6;

FIG. 8B a sequence representing a second portion of the method shown in FIG. 8A;

FIG. 9 an example of capability derivation structure and various capability types used by data processing methods referenced in FIG. 7;

FIG. 10 a sequence representing a subroutine of the method shown in FIGS. 8A and 8B, for attesting the security of the boot;

FIG. 11 an example configuration of a replicated subsystem voting on an operation to be executed by a set of replicated attestation modules;

FIG. 12 a sequence representing an alternative data processing method referenced in FIG. 7, for processing an autheticated boot of the subsystem shown in FIGS. 1 to 6 and 11;

FIG. 13A a sequence representing a first subroutine of a data processing method referenced in FIG. 7, for adding a tile to the subsystem of FIGS. 1 to 6;

FIG. 13B a sequence representing a second subroutine of the method of FIG. 13A, for removing a tile from the subsystem;

FIG. 14 a sequence representing a data processing method referenced in FIG. 7, for relabelling the subsystem of FIGS. 1 to 6;

FIG. 15A a sequence representing a first subroutine of a data processing method referenced in FIG. 7, for sealing the non-volatile memory of FIGS. 4 and 6;

FIG. 15B a sequence representing a second subroutine of the method of FIG. 15A, for unsealing the non-volatile memory of FIGS. 4 and 6;

FIG. 16 a sequence representing a data processing method referenced in FIG. 7, for recovering the subsystem of FIGS. 1 to 6 from a fault, including steps of generating an update BLOB and of carrying out an update procedure;

FIG. 17 a sequence representing a subroutine of the method shown in FIG. 16 for generating an update BLOB;

FIG. 18 a sequence representing a subroutine of the method shown in FIG. 16 for carrying out an update procedure.

DETAILED DESCRIPTION

Inter alia the present invention is concerned with securely booting a capability-based platform and/or subsystems thereof, attesting to the secure character of the boot, then maintaining the security of the booted platform and/subsystems thereof. In the foregoing, the combination of resource and permissions is referred to as the object referred by the capability, wherein capabilities have a certain type to mean that they point to similar kind of objects. However, unlike techniques observed in the prior art, the present invention considers platforms that do not depend on the correctness of single processor cores, and assumes hardware-capability units to isolate cores, for instance as described in the applicant's co-pending international patent application PCT/EP2018/053203.

An apparatus herein referred to as an attestation module, a tile-based data processing architecture, and data processing methods are all described herein, that support differentiated trust in tiles, by attesting the isolation and boot process, by supporting relocation through adding and removing tiles to and from booted subsystems, and by allowing the relabelling of capabilities equipped with authentication tokens in replicated subsystems. The scope of applicability of the methods described herein extends to replicated architectures, apt to tolerate compromise of a limited number of attestation module replicas without sacrificing platform security. Methods are further described, by which attestation module replicas in architectures booted according to the invention can be updated after they have been compromised, for repairing these boot modules.

With reference to FIGS. 1 to 3 now, the apparatus, architecture and principles described herein envisage the creation of one or more subsystems 150 and their co-location with other subsystems and a management operating system ("OS") in the same tiled multi- or many-core platform, wherein each subsystem 150 spans a certain number of tiles 120, 140 and optionally 130 of the multi- or many-core platform 100, and wherein critical components of the subsystem 150 execute on a subset of these tiles.

A tile 120, 130, 140 is any combination of computing and storage resources that are located at the same logical position in the on-chip interconnect of a network-on-chip ("NoC") 300 and that share a common network interface, wherein a hardware capability unit 310 is located at the tile-to-NoC interconnect.

Amongst tiles, compute tiles contain any combination of normal, general-purpose processor cores, special types of accelerators including graphical processing units, caches, tightly coupled memories and the interfaces required to access memory-mapped IO devices (MMIO). Applications and the management OS are processed by compute tiles and, in the architecture proposed herein, threads of an application or of the management OS must invoke capabilities located in the hardware capability unit 310 on the tile on which they execute, in order to access resources of other tiles. Memory tiles are inactive, in that they do not process threads which invoke capabilities. Such tiles contain any combination of on-chip memories, logic (e.g. to compute error correction codes ECC) that is associated with these memories, the interfaces to access off-chip storage and MMIO interfaces. Applications on compute tiles use the storage of memory tiles as additional, compute-tile-external resources, which they access by invoking capabilities.

In this context, a subsystem 150 preferably consists at least three tiles, for example comprised of a single core with local instruction and data caches, are connected to off-chip memories and other resources, the interfaces of which are also organized into a tile. Examples of the interconnecting network include busses such as ARM® AMBA, crossbars or on-chip networks.

The scale of connections can vary from between two to eight tiles in multi-core systems to several thousands in many-core systems. Tiles $120_{1-N}$, $140_{1-N}$ and optionally $130_{1-N}$ may be located on a single chip $110_{1}$; span multiple chips $110_{1-N}$ in a chip stack 100 as specifically illustrated in FIG. 1, or form blocks in 3D system designs. Each tile 120, 130, 140 may thus comprise memories of various kinds, caches, cores, accelerators, FPGA units and other logic and storage circuits. Each tile 120, 130, 140 is equipped with a capability unit 310 and this capability unit 310 forms the only connection to the NoC 300 and, indirectly, through to resources in other tiles. Special tiles may further form input-output connections to on-chip or off-chip resources that are not directly connected to the NoC 300.

Data processing architectures 150 constructed as subsystems comprise a subset 150 of tiles $120_{N}$, $140_{1-N}$ and optionally $130_{1-N}$ to implement features and functionalities of rich OSs, and to attest the secure boot of a software or firmware on the tiles in this subset 150. FIG. 2 illustrates such a subset 150, comprised of neighbouring tiles for the sake of not obscuring the present description needlessly, but it will be understood by the skilled reader that a subset may also, or instead, comprise of non-adjacent tiles. Further, the subset is shown to include at least one attestation module $120_N$ for attesting the secure boot of the subsystem 150 as will be described hereafter, but for scalability purposes, several attestation modules $120_{1-N}$ may be included in a same subsystem 150.

In particular, embodiments of the data processing architecture of the invention consider versions of such augmented multi- or many-core systems with enhanced resilience, which replicate each attestation module 120 several times: for a tolerance threshold $f_{AM}$, the required number of replicas $n_{AM}$ depends on a voting algorithm in use, for example $n_{AM}=2f_{AM}+1$ for MinBFT. and an example of which is illustrated in and described with reference to FIG. 11. The skilled reader will appreciate that the voting algorithm and number of replicas are parameters of the attestation module that need to be fixed at the time of designing the architecture, however these parameters can be defined and updated as part of the architecture recovery method described herein. Embodiments of the data processing architecture of the invention also consider the use of a trusted trustworthy kernel with more privileges than the management OS and individual subsystems for critical operations, for instance the forced revocation of tiles from a subsystem as described hereafter, wherein such a kernel should execute on specifically hardened cores 130 booted by the attestation module 120 with a <$master_0$, ID> capability which, among other permissions, grants the right to forcibly revoke a tile from the subsystem.

In the tiled architecture shown in FIGS. 1 to 3 therefore, the attestation module 120 of the invention combines a subset of tiles 120, 140 and optionally hardened tiles 130, into a subsystem 150 and attests the secure boot of this subsystem 150. Comparably to prior art enclaves, the subsystem 150 may thereby be more trustworthy than the management OS. Unlike enclaves however, for which this property holds relative to confidentiality and integrity properties, the functionality extends to maintaining booting resource availability, by revoking management OS access to the tiles 120, 130, 140 while under control of the subsystem 150.

An embodiment of an attestation module 120 is now described in greater detail with reference to FIGS. 4 to 6, wherein FIG. 4 illustrates the full configuration of an attestation module suitable for implementing all the data processing methods disclosed herein. Simpler embodiments are considered comprising only a subset of the module components described hereinafter, suitable for implementing at least the attested boot processing method described with reference to FIGS. 8A to 8C.

The attestation module 120 initially comprises a computing module 401, consisting of memory and logic to execute functionalities provided by the attestation module 120, wherein examples of this logic may include memories and a small core capable of interpreting instructions, reconfigurable logic 441 and accelerators of various kinds or a combination of these components. The computing module may however be optional, if the reconfigurable logic 441 does not implement all functionalities provided by the attestation module 120.

The attestation module 120 next comprises a number of registers. A first register is the core set register 402, in which data is stored that is representative of the current configuration of cores that belong to a booted subsystem 150. A second register is the core set history register 403, in which data is stored, for instance a numerical value, which is representative of the history of all core set configurations. A third register is the ID register 404, adapted to store a numerical representation of the currently booted subsystem and of the previous subsystem in control of the core, wherein the latter is typically the management OS, at least at a first instantiation of the booting procedure. A fourth register is the nonce register 405, which stores a random value passed by a quote-requesting system to prevent replay, wherein the attestation module 120 combines this nonce with a proof of secure boot to ensure actuality of the current status. A fifth register is the nonce-ID-core set register 406, adapted to store data representative of the proof of secure boot for a given nonce. A sixth register is the error register 407, wherein errors reported by data processing steps of the attestation module 120 and subsystem 150, for instance a mismatch of votes in a subsystem 150 with voting replicas, are stored.

The attestation module 120 next comprises configurable capability registers 410, adapted to temporarily store capabilities for the operations of the attestation module 120. In particular, the capability registers temporarily stores the initial capabilities C passed to a booted subsystem 150.

The attestation module 120 next comprises an area of volatile memory 412, in which to store both code corresponding to the first phase of the boot process of a tile, hereinafter referred to as "launch code", and a hash of the subsystem 150 which the code is supposed to boot. This area 412 of volatile memory may also be used to temporarily store updates for the attestation module 120.

The attestation module 120 next comprises an area of non-volatile memory 415, hereinafter referred to as "AM boot memory", in which to store an encrypted attestation module ("AM") boot image which may contain code, data, and descriptions for reconfigurable logic in the computing module 401 when present.

With reference to FIGS. 4 and 5, the attestation module 120 next comprises a further area of non-volatile memory 417, hereinafter referred to as "sealed memory" 417, which is partitioned into multiple segments $417_{1-N}$ and wherein each segment $417_N$ stores a data value and multiple sets of capabilities $417_3$ for previously booted subsystems 150. The set is only accessible on meeting the dual condition that the ID (404) of the booted subsystem matches the stored ID $417_1$, and the tiles (402, 403) on which this subsystem 150 has been booted match the stored core set $417_2$, wherein an empty core allows unsealing irrespective of the cores on which the subsystem is booted.

With reference to FIGS. 4 and 6, the attestation module 120 further comprises a protected area 430, defined as an area of the attestation module that is trustworthy in spite of any compromise of the remaining components $401$-$417_N$ of the module 120, and which is used by the recovery method of the invention described hereafter. In particular, data and logic stored in this area, that are used in a module-recovering step, must be sufficiently tamperproof against introspection and modification through physical attacks to the chip, and against attacks from compromised attestation modules.

Components kept in this protected area 430 include an update area 432 comprising a region of non-volatile memory in which to store an update for application to the tile 120. The update includes new update keys and keys 431 for validating and decrypting the updated AMB boot area 415, and a new circuit description 433 for the reconfigurable logic 441.

Components kept in the protected area 430 further include a key area 435 comprising a region of non-volatile memory in which to store keys for updating, attesting and booting the attestation module 120, and a circuit area 436 comprising a region of non-volatile memory in which to store a definition of the reconfigurable logic 441, wherein this latter region can be swapped with the new circuit area 433 of the update area 412 and holds at least the definition of the update logic and the ciphers used for updating and for attesting secure boots.

Components kept in the protected area 430 further include the reconfigurable logic area 441, corresponding to the part of the logic configured by the circuit area 436 that is responsible for validating and performing updates. Reconfigurable logic elements may for instance include lookup tables, routers and other FPGA building blocks. Further reconfigurable logic 441 may accordingly exist as part of a computing module 401 to assist in the operation of the -attestation module 120. In contrast to the update logic however, this logic is configured from the information stored in the attestation module boot memory 415.

The attestation module 120 may thus comprise the elements described hereinabove, however this structure is provided by way of non-limiting example only, and persons of ordinary skill in the art may understand there to be equivalent elements that may be substituted within the present disclosure without changing the essential function or operation of the apparatus 120. Moreover, the skilled reader shall note that some of the components described hereinbefore are optional, in the sense that some of the data processing methods described hereafter may be performed with a trusted platform module, with single, non-replicated attestation modules, or with attestation modules 120 that do not comprise certain components.

With reference to FIG. 7 now, in use each attestation module 120 is adapted to process a variety of data processing methods, i.e. logic, each encoded and stored as a respective subroutine which provides the attestation module 120 with a respective functionality, in collaboration with the management OS 700.

In that context, a first subroutine 701 defines a sequence of data processing instructions for securing the booting phase of a subsystem 150 of tiles and attesting to the secure boot of that subsystem. A second first subroutine 702 defines an alternative sequence of data processing instructions for securing the booting phase of a subsystem 150 of tiles and attesting to the secure boot of that subsystem, when the booted subsystem 150 comprises replicated tiles. A third subroutine 703 defines a sequence of data processing instructions for adding and removing tiles 140 from a booted system 150. A fourth subroutine 704 defines a sequence of data processing instructions for relabelling authentication tokens when the booted subsystem 150 comprises replicated tiles. A fifth subroutine 705 defines a sequence of data processing instructions for sealing and unsealing a memory storing data structures that are processed by the other subroutines described herein. A sixth subroutine 706 defines a sequence of data processing instructions for recovering a booted subsystem 150 beset by faults.

Respective data processing steps of each subroutine 701 to 706 involving some or all of the components 401 to 441 of an attestation module 120 of the invention are described hereafter with reference to FIGS. 8A to 18.

With reference to FIGS. 8A to 8C firstly, the sequence of data processing instructions 701 for securing the booting phase of a subset of cores into a trusted subsystem 150 of tiles, and for attesting to the secure boot of that subsystem, begins with launching the management OS 700 on the platform at step 800, for booting the platform in a non-authenticated fashion and with a special ID (e.g., ID=0) representative of the fact that an untrusted management OS is in control of the platform.

In this example, the boot process is for a capabilities-based system with authentication tokens, wherein capabilities take the form <type, ID> in which type refers to the resource and ID is the authentication token, and wherein authentication tokens in capabilities can lose their meaning and can be removed to reduce capabilities to <type>.

For booting a subsystem 150 on a tile t (140, optionally 130) after the platform has been booted by the management OS, at step 801a the management OS 700 selects an attestation module AM (120) to which it holds a capability <AM, 0>. In an alternative embodiment wherein the platform is a TPM-based secure boot platform, the management OS 700 selects a TPM at step 801b, to which it holds the capability <AM, 0>. In another alternative embodiment, with reference to FIG. 9, when the OS supports the derivation of capabilities, then at step 801c the management OS derives a capability <AM, 0> from a <master, 0> capability.

As the subsystem on the first tile will join additional cores to eventually form a subset S of available cores, the below description uses the set notation S={t}. Tiles t in the set S are identified by capabilities <init(t), 0>, which authorize the management OS 700 and, in turn, the attestation module 120 to reset all active components in tile t (i.e., all cores, accelerators, etc.) while preserving the state of all passive (memory) components. In preparation of the attested boot, the management OS 700 invokes memory capabilities to scratchpad memories in the booted tiles to copy the configuration of the system to boot to the tile. Alternatively, the management OS 700 installs this configuration in a memory region that is external to the booted tiles. In this case, the management OS supplies a capability to this external memory region to the attestation module.

The configuration of the system 150 to boot is comprised of a set of the code (or in case of FPGA tiles the logic description or firmware) of the to-be-booted system (denote this by CS for code segment), initial data with which the system is started (denoted by DS for data segment), and an initial set of capabilities C. At step 806, the management OS 700 computes a sufficiently unambiguous numerical representation of this configuration, for example a keyed cryptographic hash, denoted $hash_1$ in FIGS. 8A and 8B.

At step 807, the management OS 700 installs the launch code and the computed configuration hash in the volatile memory 412 of the attestation module 120 by invoking capability <AM, 0>: in a system with authentication tokens, this is only possible when the ID 404 of the attestation module 120 matches the ID field $417_1$ in the capability $417_3$.

At step 808, the management OS 700 further installs the initial set of capabilities C for the to-be-booted subsystem in 150 the capability registers 410 of the attestation module 120 and, at step 809. sets the core set register 402 to the selected tiles S. In the alternative embodiment begun by the TPM selection of step 801b, since TPMs do not support core set and capability registers 410, nor do they provide launch code memories 412, the information in these components must be directly installed in the to-be-booted tiles 140 (130) and later measured there, which implies trusting the tile to return this state when the TPM measures it. Advantageously, the attestation module 120 of the invention requires no such trust.

Steps 801a to 809 prepare the to-be-booted tiles 140 (130) and the attestation module 120 for authenticated booting and, when this preparation is completed, the management OS 700 next initiates the authenticated boot by invoking capability <AM, 0> at step 810.

At step 811, the attestation module 120 copies the value of the ID register 404 into a backup version of this register and, at step 812, the attestation module 120 measures the launch code and configuration hash 412 by computing an unambiguous numerical representation $hash_2$ of the measured code and hash. At step 813, the attestation module 120 creates a numerical representation $hash_3$ of the capability set C and, at step 814, stores the combined numerical representation of the measurement $hash_2$ and the numerical representation of C $hash_3$ in the ID register 404. In the system with authentication token capabilities of the example, the storing of step 814 changes IDs and thus pre-empts the validity of capability <AM, 0>. In alternative embodiments without authentication tokens capabilities, all outstanding <AM> capabilities must be revoked for reducing permissions and thereby prevent the management OS 700 from attesting itself as secure subsystem.

At step 815, the attestation module 120 next invokes the second capacity <init(t), 0> to stop the first tile t∈S from booting. At step 816, the attestation module 120 then copies the launch code and the configuration hash 412 to the memory of this first tile and, at step 817, invokes a special capability <$init_0(t)$, 0>, which only attestation modules 120$_N$ can derive from <init(t), 0>, for changing the ID of t to the value stored in the preceding step 814 in the ID register 404 of the attestation module 120 and resuming execution of the tile at the launch code.

In the alternative embodiment begun by the TPM selection of step 801b, the management OS 700 still needs to stop tile t and must install the capabilities C prior to booting this tile. Accordingly, in this alternative embodiment, steps 811 to 817 need to be merged into a single step, in which the TPM measures the launch code installed in tile t before the tile boots, then appends this measurement and a measurement of the capabilities C to a platform control register in the TPM.

At step 818, the attestation module 120 then copies the capabilities C into the capability registers 410 of the hardware capability unit 310 of t. At step 819, the attestation module 120 next adds a capability <AM, ID> and a capability <master, ID>, into the capability registers 410 of the hardware capability unit 310 of t. These additional capacities authorize the tile respectively to obtain a certificate of the booted system and to create new capabilities with the authentication token set to ID.

The boot proceeds with the launch code waiting for the capabilities in C to be installed by the attestation module 120, whereby the attestation module 120 measures the configuration and compares the measurement against the configuration $hash_1$ at step 820. A question is next asked at step 821, about whether the comparison of step 820 is positive. If the answer to the question of step 821 is negative, then a corresponding error report is generated and stored in the error register 407. Alternatively, the answer to the question of step 821 is positive, whereby the attestation module 120 finally transitions control to the measured configuration at step 822.

With reference to FIG. 10 now, a subroutine of the first method 701 for proving secure boot on a tile t 140 (130) towards a client c, is invoked by receiving a nonce, i.e. a random value, from the client c as a quote-requesting system. Accordingly this subroutine is an iterative loop begun by a question at step 850, about whether the subsystem 150 has received a client nonce. The question is answered negatively and loops. so long as a nonce has not been received. When the question is answered positively, the subsystem 150 invokes <AM, ID> at step 851, whence the nonce received from c is installed in the nonce register 405 at step 852. This update causes the attestation module 120 to update the nonce-ID-core set register 406 to a signature of the nonce 405, the core set 402 and the ID 404 at step 853. Control thereafter returns to the question of step 850.

In an alternative embodiment of the subroutine 701 modified to use replicated attestation modules with authentication token capabilities, <Init(t), 0> capabilities installed by the management OS 700 are automatically transformed into replica identifying capabilities <AM, ID> and <master, X> that are added for all replicas of the attestation module, wherein these capabilities identify the replica. The provision of a <master, X> capability only authorizes creation of capabilities to tiles 140 (130) with ID X. Since X does not include the core set, installing the same system 150 twice without distinguishing elements, would allow one system to create capabilities for the other. To solve this issue, distinct instances are differentiated in the configuration data and hence in the configuration hash passed to the launch code. Since the attestation module 120 will never be required to invoke capabilities other than <init(t),X> or <$init_0(t)$,X> with some ID X, the remaining capabilities of the set C are stored in a degenerated capability register file, which disallows invocation.

Consequentially, replicated attestation modules 120$_{1-N}$ which invoke capability <AM, 0> trigger a consensual boot by all attestation module replicas 120$_{1-N}$, during which each replica measures the launch code, configuration hash and initial capability set C separately. Moreover, when deriving <$Init_0(t)$, 0> from <Init(t), 0>, the replica ID is preserved. Furthermore, the capability unit of tile t only accepts stopping and resuming the tile 120, 130, 140 with a different ID, if a quorum of attestation module replicas 120$_{1-N}$ agree.

With this embodiment, the proof of secure boot subroutine previously described with reference to steps 850 to 853 changes in that, instead of one replica reporting the signed hash of the nonce, ID and core set triple 406 at step 853, the subsystem 150 requests such a proof from all attestation module replicas 120$_{1-N}$, and sends as proof a quorum of matching attestation responses received from the queried attestation module replicas 120$_{1-N}$.

The sequence of data processing steps 801a to 822 can be integrated into a TPM, in all variants of the attestation module 120, and platforms integrating them. This boot process is however limited to starting a single tile t 140 (130), wherein the scale of the subsystem 150 is augmented thereafter. This approach, whilst improving the secure character of the boot process, still leaves a window of vulnerability during the boot process, when the subsystem does not comprise replicated tiles, or comprises too few replicas that are active for tolerating the up to $f_c$ faults that a completely booted replicated system is able to withstand.

To close this window of vulnerability for most critical subsystems, an alternative embodiment of the sequence of data processing steps is now described with reference to FIGS. 11 and 12, for booting a quorum of replicated tiles which is able to withstand $f_c$ faults from the first instance. In this alternative embodiment, when a subsystem 150 requires tolerating up to fc faulty or compromised replicas 120, 130, 140 and so requires nc replicas 120, 130, 140 for the purpose, the booting method authenticates the simultaneous boot of nc replicas, including replication of the attestation module 120 and the critical components booted with the help of this module 120. Subscripts are preferably used to distinguish the number of attestation module replicas $n_{AM}$, the number $f_{AM}$ of faults which they can tolerate, the number $n_c$ of critical-component replicas (executing on $n_c$ distinct cores) and the number $f_c$ of faults that these $n_c$ replicas can tolerate. $n_{AM}$, $f_{AM}$, $n_c$, and $f_c$ are natural numbers, and the parameters $n_{AM}$ and $f_{AM}$ are fixed at the time the system is created, whilst $n_c$ and $f_c$ can be chosen dynamically, wherein $n_c$ is limited only by the number of cores available in the multi- or many-core platform 10.

FIG. 11 illustrates a desirable invocation architecture for replicated components in subsystems 150, wherein operations that are performed by subsystem management replicas $1101_{1-3}$ of respective subsystem tiles $140_{1-3}$, in the context of subroutines 702 and 706 at least which inter alia involve replicas, are voted upon by channelling operation proposals, such as invoking a capability of each tile, through a voter module 1110 to one or more attestation modules $120_{1-N}$. The voter module 1110 forwards the request to a single attestation module $120_1$ or, if the attestation module is itself replicated, to the replicas $120_{2-3}$ of this module, upon reaching a quorum of agreement on the operation.

The data processing steps of this alternative, "quorum" boot protocol 702 generally follow the steps 801-822 of the first embodiment of the booting process described with reference to FIGS. 8A and 8B, with the following exception however. With $n_c$ as the number of tiles that need to be booted to form safe and available quorums able to withstand up to $f_c$ faults, the quorum boot protocol simultaneously boots $n_c$ tiles as follows. This set of booted tiles may optionally be extended into a final or larger subsystem size, using subroutine 703 described hereafter.

To boot a subsystem A (150) with $n_c$ replicas $1101_{2-N}$ of a subsystem manager $1101_1$ on a set of tiles $S=t_1, \ldots, t_{nc}$, the management OS 700 again selects an attestation module AM (120) at step 801a, to which it holds a capability <AM, 0>. Alternatively, when the platform is a TPM-based secure boot platform, the management OS 700 may again select a TPM at step 801b, to which it holds the capability <AM, 0>. Tiles tin the set S are again identified by capabilities <init(t), 0> at step 802.

The management OS 700 again prepares each tile as per steps 803 to 809: the management OS 700 invokes memory capabilities to scratchpad memories of all to-be-booted tiles 140 (130) for copying the configuration of the system to boot to these tiles at step 803. As before, the configuration of the system to boot is comprised of a code segment CS, a data segment DS, and an initial set of capabilities C, however in this embodiment the configuration is divided into $n_c$ subsets $C_1, \ldots, C_{nc}$, at step 1201.

Capabilities to critical resources held by all capabilities need unique replica identifiers for distinguishing replicas from each other during voting operations. As the purpose is to boot replicas with a unique ID, but to distinguish replicas nonetheless, at step 1202 an identifier i of each replica is assigned in DS at a known location, for instance wherein tile $t_i$ is identified by identifier i. Optionally, as a further precaution to prevent booting a compromised subsystem 150, the management OS 700 installs as part of each set of capabilities $C_i$, wherein this allows the replica to introspect the state of all other subset management tiles.

The management OS 700 next computes a sufficiently unambiguous numerical representation of the configuration of the system to boot, for instance again a keyed cryptographic hash, excluding the replica identifier i, then installs the launch code and the computed configuration hash in the volatile memory 412 of the attestation module 120 by invoking capability <AM, 0>. The management OS 700 next installs the initial set of capabilities C for the to-be-booted subsystem in the capability registers 410 of the attestation module 120 and sets the core set register 402 to the set S.

Having prepared the to-be-booted tiles and the attestation module, the management OS initiates the authenticated boot by invoking capability <AM, 0> at step 810. The attestation module 120 starts by copying the value of the ID register 404 into a backup version of this register and by measuring the launch code and configuration hash by computing an unambiguous numerical representation of the measured code and hash, as per steps 811, 812. The attestation module 120 further creates a numerical representation of the capability set C as per step 813 and stores the combined numerical representation of the measurement and the numerical representation of C in the ID register 404 as per step 814. In platforms systems without authentication tokens, <AM> capabilities need to be invalidated.

After measuring, the attestation module 120 invokes <init(t), 0> as per step 815, however in this embodiment for all tiles t∈S. The attestation module 120 then copies the launch code to the memory of these tiles as per step 816 and, at step 1203, appends the replica identifier i to the configuration hash, for instance by computing a hash of the configuration hash and the replica identifier i. At step 1204, the attestation module 120 copies the appended hash to the configuration hash location in the boot code. The attestation module 120 then derives and invokes <init$_0$(t), 0> to change the ID of t to the value in the ID register 404 of the attestation module 120 for resuming execution of the tiles 140 (130) at the launch code, as per step 817.

At step 1205, for all tiles $t_i$ in the set S, the attestation module 120 copies the capabilities $C_i$ into the capability registers 410 of the respective hardware capability unit 310 of each tile $t_i$ and, at step 1206, the attestation module 120 adds a capability <AM, ID> and a capability <master, ID>, both impersonated with the replica identifier i.

As before, the boot proceeds with the launch code waiting for the capabilities in $C_i$ to be installed by the attestation module 120, after which it measures its own configuration. Finally, the launch code relinquishes control to the code in the code segment as per step 822.

In an alternative embodiment of the subroutine wherein introspection is used, then the launch code may further measure the configuration of all peer replicas through introspection capabilities, then compare the measurement against the configuration hash with the respective replica identifier, to finally engage in a vote for ensuring that a quorum of replicas has been booted correctly. In this instance, the launch code relinquishes control at step 822 only if the replica vote succeeds, i.e. no progress can be made unless a quorum of subsystem replica confirms the validity of the boot of their peer replicas.

With reference to FIGS. 13A and 13B now, a sequence of data processing instructions 703 respectively for adding and removing tiles is described, which advantageously complements either of the previously-described secure booting and attesting subroutines, in that it allows booted subsystems 150 to modify their number of tiles whilst preserving the secure property of the initial-boot as attested. This adding/subtracting subroutine may be invoked either immediately after the control transitioning of step 822, for instance as an adjunct to the quorum boot subroutine 702 for adding replicas to the subsystem 150, or at a later time during runtime, for instance in parallel or further to invoking the recovery subroutine 706 described hereafter.

The subroutine for adding one or more tiles is illustrated in FIG. 13A, and begins at step 1301 with the management OS 700 deriving a capability <init(t), 0> for the new tile t 140 (130) to be added and passing this capability to the subsystem 150. At step 1302, the management OS 700 next invokes the <AM, ID> capability, whereby the subsystem 150 passes the <init(t), 0> capability to the attestation module 120.

For adding the new tile t, at step 1303 the attestation module 120 executes a step similar to steps 815, 816 and 817 of booting subroutines 701, 702, in that it stops the new tile t, updates the core set register 402 to include the new tile t, whilst keeping a numerical representation, for instance a hash, of the previous, historic core set 403 and the current configuration (CS, DS, C).

The attestation module 120 then copies its identifier ID 404 to the ID register 404 of the added tile 140 (130) at step 1304; copies the launch code to the added tile 140 (130) at step 1305; and resumes execution at step 1306, at a procedure that awaits capabilities, allowing the code to resume from the subsystem cores that are already active. Since changing the identifier ID 404 invalidates the <init(t), 0> capability held by the booted subsystem 150, at step 1307 the attestation module 120 converts the <init(t), 0> capability into a <init(t), ID> capability and, at step 1308, provides the invoking subsystem 150 access to this <init(t), ID> capability. The rights conveyed by <init(t), 0> to the added tile t are thereby preserved.

Two main approaches are available for removing or subtracting one or more tiles 140 (130) from a booted subsystem 150, for the management OS 700 to regain control thereof:

either through the subsystem 150 voluntarily releasing control over the tile; or, in an alternative embodiment, by instructing a trusted-trustworthy kernel to forcibly revoke the tile from the subsystem 150, an operation to which the trusted-trustworthy kernel will typically agree only if a pre-negotiated revocation condition is fulfilled.

The subroutine for the subsystem to voluntarily remove or subtract one or more tiles is illustrated in FIG. 13B, and begins at step 1310 with the subsystem invoking its <AM, ID> capability with a <init(t), ID> capability for the tile t (130 or 140) to remove. At step 1311 the attestation module 120 stops the tile t, resets the capability unit 310 of t to invalidate all capabilities held by t, and changes the ID 404 of t to a null value 0. At a next step 1312, the attestation module 120 removes t from the core set register 402 then, at step 1313, updates the core set history 403 by hashing the old register value $403_{-1}$ with the new core set 402 suitably reduced by the tile removal.

The alternative approach of a forcible revocation of tiles from a subsystem 150 is preferably performed through a trusted-trustworthy component, such as a trusted hypervisor because in the absence of this component, the management OS 700 could revoke resources at any point in time, when they may still be required by the subsystem 150, thus jeopardizing the subsystem's availability or timeliness guarantees. Such a trusted hypervisor subsystem is preferably equipped with a special capability <$master_0$, X> and so may derive a <reset(t), X> capability to instruct the responsible attestation module 120 to perform revocation steps 1311 to 1313 as previously described, however wherein the whole state of tile t is reset. As a special case, the identifier X in the <reset(t), X> capability need not match the ID 404 of the attestation module 120.

As with booting subroutines 701 and 702 which can be integrated into a TPM, the tile adding and subtracting subroutine 703 can also be executed with a TPM, however with a modification to revoke the capability <init(t)> from the management OS 700 once the attestation module 120 adds the tile at step 1306, whereby step 1307 is not required in such an embodiment.

In the specific context of subroutine 702 involving replicated attestation modules $120_{1-N}$, the tile stop and resume operations and the invocation of <init0, 0> to change the identifier ID of the added or removed tile's capability unit 310 may become voted reconfiguration operations that require a quorum of subsystem replicas, apt to prevent a minority of compromised attestation module replicas $120_{(1-(N-2))}$ from executing these critical operations. In such an embodiment, with reference to FIG. 11 again, a similar invocation structure is used for these adding and removing operations, wherein each subsystem management replica $1101_{1-N}$ invokes the <AM, ID> capability of its respective tile 130 or 140 to propose the joining or leaving of a tile to the subsystem 150. Upon agreement on the operation, the voter 1110 forwards the request to a single attestation module 120 or, if the attestation module is itself replicated, to all replicas $120_{1-N}$ of this module.

With reference to FIG. 14 now, a sequence of data processing instructions 704 for revoking all outstanding capabilities to a subsystem 150, by requesting the attestation module 120 to relabel the subsystem 150, is described, which advantageously complements either of the previously-described secure booting and attesting subroutines, in that it allows booted subsystems 150 to remedy situations wherein confidence in the trustworthiness of legacy capability revocation methods cannot be sustained. This relabelling routine may again be invoked either immediately after the control transitioning of step 822, or at a later time during runtime, for instance in parallel or further to invoking the recovery subroutine 706 described hereafter.

The subroutine for relabelling the subsystem 150 begins at step 1401 with a subsystem's manager 1101 invoking the <AM, ID> capability with <master, ID>. Consequently, at step 1402 the attestation module 120 derives <$init_0$(t), ID> capabilities for the or each tile t ($130_{1-N}$, $140_{1-N}$) of the core set 402 and, at step 1403, changes the tile's respective identifier ID to an alternative identifier ID', wherein ID' is a numerical representation jointly of the identifier ID and relabelling occurrence, for instance taking the form of hash(ID, "relabel").

Once all tiles are relabelled, at step 1404 the attestation module 120 changes its own identifier ID 404 to the alternative identifier ID'. At step 1405, the attestation module 120 installs a <master, ID'> capability and a <AM, ID'> capability in all subsystem manager tile(s) ($130_{1-N}$, $140_{1-N}$). At step 1406, the subsystem manager tile(s) can then derive, from <master, ID'>, new capabilities with the alternative identifier ID' by way of authentication token.

With reference to FIGS. 15A and 15B now, a sequence of data processing instructions 705 respectively for sealing and unsealing the memory 417 is described, which advantageously complements the previously-described quorum-based secure booting and attesting subroutine 702, in that sealing effectively links data to the ID of the booted subsystem 150 whereby this data becomes accessible only if the subsystem 150 has been booted. The subroutine assists replicated attestation modules with protecting sealed memory content against leakage, for instance as part of a quote, by combining secret sharing with sealed memory. This sealing/unsealing subroutine may be invoked either immediately after the control transitioning of step 822, or at a later time during runtime.

Accordingly, the subroutine for sealing the memory 417 is illustrated in FIG. 15A, and begins at step 1501 with a question about whether the attestation module 120 of the booted subsystem 150 comprises a sealed memory 417. When the question of step 1501 is answered positively, since each quorum-booted replica in must receive back only its own capabilities, then at step 1502 the sealed capabilities 417₃ of the sealed memory 417 are partitioned by the replica identifier i, wherein access to partition i of the sealed capabilities 417₃ is granted only to replica ion tile $t_i$.

At step 1503, each replica 1101$_{1-N}$ of the subsystem manager 1101 encrypts the data d to be protected and generates a secure hash of this data with a randomly generated key k. At step 1504, each replica 1101$_{1-N}$ stores the encrypted data and the hash in external non-volatile memory. At step 1505, the subsystem manager replicas 1101$_{1-N}$ each pick n points $p_i$ for forming a polynom p of a degree that matches the size of the quorum of attestation module replicas 120$_{1-N}$. The condition p which must fulfil is p(0)=k. At step 1506, the subsystem manager replicas 1101$_{1-N}$ then perform a sequence of voted operations to install the points $p_i$ into the sealed memory 417 of the attestation module replicas 120$_{1-N}$ such that each attestation module replica $r_i$ stores a respective $p_i$.

The unsealing subroutine generally performs steps 1502 to 1506 in reverse order: the subsystem manager replicas 1101$_{1-N}$ retrieve n points $p_i$ from different attestation module replicas 120$_{1-N}$, reconstruct the polynom p, retrieve the key k and decrypt the stored data d. However, because up to $f_{AM}$ faulty replicas 120$_{(1-(N-3))}$ of the attestation module 120 may delete or alter their stored point $p_i$, not all combination of quorum points may form a valid polynom p. The embodiment of the unsealing subroutine illustrated in FIG. 15B mitigates the above risk, and begins at step 1511 with setting a subsystem replica 1101$_N$ as a lead subsystem replica $r_i$. At step 1512, the lead subsystem replica $r_i$. combines a plurality of n points, the number of which a function of the quorum size, into a polynom p and, at step 1513, computes k=p(0).

At step 1514, the lead subsystem replica $r_i$. decrypts the data d and hash h(d) and compares the hash of d with the stored value h(d). A question is next asked at step 1516, about whether the comparison returns a match. If the question of step 1516 is answered positively, then at step 1517 the lead replica $r_i$ waits on other replicas 1101$_{(2-N)}$ to confirm this operation, as they each respectively repeat steps 1512 to 1515. When the question of step 1516 is answered negatively however, control returns to step 1512 wherein the lead subsystem replica $r_i$. attempts a different combination of n points, until it find a combination which satisfies the matching of step 1516.

In an alternative embodiment of the unsealing subroutine, the quorum size and number of attestation modules 120$_{1-N}$ may be increased such that the quorum size is at least $2f_{AM}+1$ replicas, whence $n_{AM}$ is at least $3f_{AM}+1$ and p remains a $f_{AM}+1$ degree polynom. The validation of the polynom from the $n_{AM}$ stored points may then be performed by picking $f_{AM}+1$ points, such that $f_{AM}$ further points are solutions of the same polynom. The polynom so validated is then used for retrieving the key k=p(0). and for encrypting the data.

With the exception of using different ciphers in different attestation module replicas, the respective versions of subroutines 701 to 705 for replicated attestation modules 120$_{1-N}$ prepare a booted subsystem 150 to tolerate compromise of up to $f_{AM}$ attestation module replicas. However, under persistent attacks, this threshold may get exhausted wherein, as more than $f_{AM}$ replicas get compromised, the security properties of the subsystem 150 are eventually exceeded.

Accordingly, with reference to FIGS. 16 to 18 now, a sequence of data processing instructions 706 is described for returning one or more booted attestation module replicas into a healthy state after any of compromising, breaking of the cipher in use, or leaking of the replica key. This recovery subroutine may be invoked either immediately after the control transitioning of step 822, or at a later time during runtime, subject to the timing and intensity of attacks. This subroutine moreover requires an embodiment of the attestation module 120 comprising the protected chip area 430 and its various sub-components as described with reference to FIGS. 4 and 6.

The steps to update components in the protected area 430 of an attestation module 120 begin during a voted operation 1601, for instance a replica vote during the quorum booting sequence 702 or the installation of points $p_i$ into sealed memories 417 during the sealing thereof in the sequence 705, with a question 1602 about whether one of the replicated attestation modules 120$_{1-N}$ has detected a vote mismatch. When the question is answered negatively, control returns to the extant voted operations. However, when the question of step 1602 is answered positively, the detecting module 120$_N$ generates an error report in the error register 407 at step 1603, which the management OS 700 may then forward to the attestation module developer.

The error register 407 contains a counter, which is incremented by each report generated at step 1603, whereby a question is next asked at 1604, about whether the current counter value now exceeds a predefined threshold. The predefined threshold is preferably representative of the level of compromising corresponding to $f_{AM}$ attestation module replicas. When the question of step 1604 is answered negatively, the counter is not yet representative of a compromising of up to $f_{AM}$ attestation module replicas, whereby the subroutine 706 ends However, when the question of step 1604 is answered positively i.e. the counter exceeds the predefined threshold, the reconfigurable logic 441 of the detecting attestation module 120$_N$ disables it at step 1605, wherein the disabled module refuses to participate in further votes. Accordingly, cumulative errors eventually lead to unavailability of the platform.

An attestation module developer is responsible for vouching for the correctness of attestation modules 120 and for providing updates therefor. Third parties may decide to mistrust the attestation module developer, by demoting this developer's devices to an untrustworthy state. To mitigate these penalties, the developer must initiate the recovery of an attestation module replica, by generating the relevant update and forwarding it to the management OS 700 as an update Binary Large Object ("BLOB") at step 1606. The subroutine involved by sequence step 1606 is further described with reference to FIG. 17.

A question is first asked at step 1701, as to whether the developer has received error reports forwarded by the management OS 700 at step 1603 or, alternatively, has detected a breach of a used cipher or, alternatively still, whether a predetermined time interval has lapsed since a previous update (since the confidence in the protection of shipped attestation modules reduces over time). When the question of step 1701 is answered positively, the developer initiates the recovery of an attestation module replica with firstly defining an update for the circuit area 436 at step 1702, which may include an update of the cipher used for validating updates, and wherein the update may optionally include accelerators for novel cipher algorithms used by the computing module 401.

At a next step 1703, an updated is defined for the attestation module boot memory 415, i.e., the code and data used by the computing module 401 to implement the attestation module functionality that is not implemented in the reconfigurable logic 441 in the protected compartment 430. At a next step 1704, new keys are defined for the next update, for the attestation module boot, for the root key used to derive keys for attestation (i.e., those used for creating a proof of secure boot in subroutine 701) or, in case the attestation keys are directly embedded, the attestation keys, and keys for verifying the integrity of the attestation module boot memory 415. At a next step 1705, the attestation module boot memory 415 is encrypted with the attestation module boot keys generated in the previous step 1704. The update BLOB is complete at this stage, and so signed and encrypted with the current update keys at step 1706, before the developer forwards it to the management OS 700 at step 1707. The update key for encrypting the update BLOB may for instance be a one-time pad.

Returning to FIG. 16 now, subroutine 706 resumes upon receiving a signed and encrypted update BLOB from the developer at step 1607, whereby the management OS 700 next invokes the <AM, 0> capability on the detecting attestation module replica to update at step 1608, for copying the update BLOB into the launch code memory 412 thereof then, at step 1609, to invoke the update procedure for this attestation module replica. The subroutine involved by sequence step 1609 is further described with reference to FIG. 18.

In this embodiment, the update procedure of step 1609 is implemented entirely using the reconfigurable logic 441 of the attestation module 120 to update. At step 1801, the reconfigurable logic 441 initially decrypts the update BLOB, then verifies its integrity at step 1802 using the update cipher in the reconfigurable logic 441 and the update keys in the key area 435, for instance with XOR-ing using the one time pad cipher for decrypting the data. A question is next asked at step 1803, about whether the integrity check has validated the update. When the question of step 1803 is answered negatively, the reconfigurable logic 441 generates an error report 407, eventually prompting a new update BLOB by the developer as hereinbefore described. Alternatively, the question of step 1803 is answered positively and the update logic installs both the new keys of step 1704 into the key area 435 at step 1804, and the new and encrypted attestation module boot image of step 1703 into the non-volatile attestation module boot memory 415 at step 1805.

The update logic next disables all parts of the detecting attestation module at step 1806, aside from the portion of the update logic which, at step 1807, swaps the current circuit area 436 with the region 433 in the update area 432 that contains the new circuit description: the area storing the new circuit description 433 becomes the current circuit area 436, and the previous circuit area 436 is repurposed into the update area 432 for accommodating a next, future update. Upon completing the switch of step 1807, the remaining portion of the update logic triggers a reset of the attestation module 120 at step 1808, which causes it to restart in the updated state. After the reboot of step 1808, further attestation module replicas $120_{(2-N)}$ can be updated with their respective update BLOBs to fully replace the previous configuration.

Within the context of subroutine 706, a protocol may optionally be provided for the starting sequence of an attestation module replica, in order to better support the recovery of this module according to steps 1601 to 1609. An embodiment of this protocol is illustrated in FIG. 16 also, wherein the attestation module 120 should start in the reconfigurable logic 441 in the protected region 430 with a logic description in the protected circuit area 436.

This logic initially checks the integrity of the attestation module boot memory 415 at step 1611, then decrypts it into the volatile memory of the computing module 401 at step 1612. The attestation module boot image may contain code, data, and descriptions for reconfigurable logic 441 in the computing module 401. The protected logic then provides the computing module 401 with the keys 435 that it requires for normal operation, however not those required for an update or a boot. The protected logic thus forwards the attestation keys into the computing module 401 at step 1613 and the root key into the computing module 401 at step 1614. In alternative embodiments wherein attestation modules are conferred increased protection, the protected logic may keep all keys, and instead offer encryption and decryption functionalities in which one or more of these keys can be selected.

The architecture and algorithms disclosed herein thus aim to mitigate advanced and persistent threats, including sophisticated attacks by highly-skilled and well-equipped adversaries seeking to compromise, variously: all software layers including the hypervisor and the code of processor cores; tiles at the hardware level (e.g. by manipulating the IP blocks to install trapdoors that grant them supervisor privileges on the compromised tile); off-chip resources (e.g. a network card), which grants them a high-speed entrance to the system to persist in their attack; and the system's attestation modules 120.

Generally, the inventive principles described herein implement security, dependability and fault and/or intrusion tolerance techniques. More specifically, the inventive principles described herein find application both in secure and dependable architectures, and in middleware assisting the resilience of large-scale systems and critical information infrastructures, examples of which include cloud storage, telecommunication networks, energy distribution and management, highly-sensitive data storage and administration systems, and real-time networked embedded systems such as connected and autonomous vehicles.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as a read-only memory ("ROM"), an optical recoding medium or a magnetic recording medium. The carrier may be an electrical or optical signal which may be transmitted via an electrical or an optical cable or by radio or other means.

The invention is not limited to the embodiments hereinbefore described but may be varied in both construction and detail. For example, it will be readily understood by skilled persons that the inventive principles disclosed herein in relation to hardware architectures and/or components and/or their arrangement may be permanently integrated into the standard configuration of a micro-processor through relevant manufacturing techniques.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention claimed is:

1. A module (120) in a capability-based computing and/or data processing architecture (100), comprising:
    storage means for storing a plurality of data structures (404, 410, 412) and a first set of instructions (415), wherein
        a first data structure (404) comprises a first data sequence representative of a booted subsystem, the subsystem comprising at least three computing units in the architecture, each computing unit comprising at least one computing resource,
        a second data structure (410) comprises a set of at least one capability passed to a subsystem to boot, and
        a third data structure (412) comprises a second data sequence representative of a configuration of the subsystem to boot and a set of booting instructions;
    computing means configured by the first set of instructions (415) to
        compute (811-814) the first data sequence based on the stored second data sequence, the stored set of booting instructions and the stored capability set,
        selectively reset and stall each computing unit (130, 140) of the subsystem,
        copy the stored capability set (410), the second data sequence and the stored set of booting instructions (412) to a memory resource of a stalled computing unit,
        change an identifier of the stalled computing unit to the computed first data sequence (404), then
        allow the stalled computing unit to resume booting; and
    interfacing means (310) for operably interfacing the module in data communication with computing units of the architecture.

2. A capability-based computing and/or data processing architecture comprising:
    at least one subsystem (150) to boot, the or each subsystem to boot comprising at least three computing units (120, 130, 140), each computing unit comprising at least one computing resource;
    wherein at least one computing unit in the or each subsystem comprises a module (120) operably interfaced with other computing units (130, 140) of the subsystem;
    wherein the module (120) comprises a storage resource for storing a first set of instructions (415) and a plurality of data structures (404, 410, 412) including:
        a first data structure (404) comprising a first data sequence representative of a booted subsystem,
        a second data structure (410) comprising a set of at least one capability passed to a subsystem to boot, and
        a third data structure (412) comprises a second data sequence representative of a configuration of the subsystem to boot and a set of booting instructions; and wherein the module (120) further comprises a computing resource configured by the first set of instructions (415) to:
        compute (811-814) the first data sequence based on the stored second data sequence, the stored set of booting instructions and the stored capability set,
        selectively reset and stall each computing unit (130, 140) of the subsystem,
        copy the stored capability set (410), the second data sequence and the stored set of booting instructions (412) to a memory resource of a stalled computing unit,
        change an identifier of the stalled computing unit to the computed first data sequence (404), then
        allow the stalled computing unit to resume booting.

3. A data processing method for booting a subsystem (150) comprising at least three computing units in a capability-based computing and/or data processing architecture, each computing unit comprising at least one computing resource, at least one computing unit in the subsystem comprising a module (120) operably interfaced with other computing units (130, 140) of the subsystem, the method comprising the steps performed at the module, of:
    storing a first set of instructions (415),
    storing a first data structure (404) comprising a first data sequence representative of the booted subsystem (150);
    storing a second data structure (410) comprising a set of at least one capability passed to the subsystem to boot;
    storing a third data structure (412) comprising a second data sequence representative of a configuration of the subsystem to boot and a set of booting instructions;
    computing (811-814) the first data sequence based on the stored second data sequence, the stored set of booting instructions and the stored capability set;
    selectively resetting then stalling each computing unit (130, 140) of the subsystem;
    copying the stored capability set (410), the second data sequence and the stored set of booting instructions (412) to a memory resource of a stalled computing unit;
    changing an identifier of the stalled computing unit to the computed first data sequence (404); and
    allowing the stalled computing unit to resume booting.

4. A method according to claim 3, comprising the further steps of:
    storing a fourth data structure (402) representative of a current configuration of cores comprised in the booted subsystem;
    storing a fifth data structure (405) comprising at least one random value received from a quote-requesting system to prevent replay; and
    generating a signature from the at least one random value (405), the fourth data structure (402) and the computed first data sequence (404), wherein the signature attests to the secure booting of the subsystem.

5. A method of booting a subsystem according to claim 3, comprising the further steps of:
    storing a data segment for processing by the set of booting instructions;
    containing (1202) a computing unit replica identifier in the data segment;
    computing (1203) a third data sequence based on the computed first data sequence and the stored identifier;
    wherein the step of storing the second data structure further comprises dividing (1201) the capability set into at least two subsets;

wherein the step of changing the identifier of each stalled computing unit further comprises changing (817 in 702) the identifier to the computed third data sequence; and wherein the step of copying the stored capability set further comprises storing (1205, 1206) at least one capacity subset with a respective computing unit replica identifier to the memory resource of each stalled computing unit.

6. A method according to claim 5, comprising the further steps of:

polling each computing unit replica of the booted subsystem (150) with a voter module (1110); and reserving the step of allowing the stalled computing unit to resume booting upon reaching a quorum of computing unit replica votes; and optionally reserving the step of generating the signature attesting to the secure booting of the subsystem (150) upon reaching a quorum of computing unit replica votes.

7. A method according to claim 3, comprising the further steps of:

selecting, resetting then stalling a further computing unit (130, 140);

updating the third data structure (402) for the stored second data sequence to be representative of a current configuration of cores comprised in the booted subsystem (150) including the further computing unit;

computing the first data sequence;

copying the stored capability set, the second data sequence and the stored set of booting instructions to a memory resource of the further computing unit;

changing an identifier of the further computing unit to the computed first data sequence; and allowing the further computing unit to resume booting.

8. A method according to claim 3, comprising the further steps of:

selecting a computing unit (130, 140) of the booted subsystem (150);

stopping the selected computing unit (130, 140);

changing the identifier of the stopped computing unit corresponding to the computed first data sequence to a null value; and updating the third data structure (402) for the stored second data sequence to be representative of a current configuration of cores comprised in the booted subsystem (150) excluding the selected computing.

9. A method according to claim 3, comprising the further steps of:

computing an alternative data sequence based on the computed first data sequence and data representative of a relabelling event;

changing the computed first data sequence to the computed alternative sequence in each computing unit and the module of the subsystem (150);

copying the stored set of booting instructions to the memory resource of each computing unit; and allowing each computing unit to resume booting.

10. A method according to claim 5, comprising the further steps of:

partitioning a set of at least one capability stored in the memory (417) by the computing unit replica identifier at each module replica (120$_{1-N}$); and at each computing unit replica, encrypting data to be secured in the memory with a key, generating a data sequence representative of the data and storing the encrypted data and generated data sequence;

selecting n points $p_i$ for forming a polynom p of a degree matching the size of the quorum of module replicas 120$_{1-N}$, wherein p(0) is equal to the key; and performing a sequence of voted operations to install the points $p_i$ into the memory 417 of each attestation module replicas 120$_{1-N}$ such that each module replica $r_i$ stores a respective point $p_i$.

11. A method according to claim 10, comprising the further steps of:

at each computing unit replica, retrieve n points $p_i$ from a plurality of attestation module replicas 120$_{1-N}$;

combining a plurality of the retrieved points into a polynom p, wherein the plurality is a function of the size of the quorum of module replicas 120$_{1-N}$;

computing the key as a function of p(0);

decrypting the stored data with the computed key;

generating a data sequence representative of the decrypted data and comparing same with the stored data sequence for a match;

wherein the steps of combining, computing, decrypting, generating and matching are repeated with a different plurality of retrieved points in case of matching failure.

12. A method according to claim 5, wherein the module (120) further comprises a tamperproof protected storage area (430) storing cryptographic keys and a reconfigurable logic (441), the method comprising the further steps of:

detecting a voting operation mismatch in the subsystem (150);

communicating an alert representative of the detection;

receiving a data structure comprising cryptographic keys and an encrypted updated set of instructions comprising an updated circuit description for the module;

replacing the keys stored in the tamperproof protected storage area with the received cryptographic keys;

replacing the first set of instructions (415) with the encrypted updated set of instructions;

disabling the module (120) save as to a portion of the reconfigurable logic;

swapping a first portion of the tamperproof protected storage area storing a current circuit description of the module for a second portion of the tamperproof protected storage area storing an updated circuit description of the module; and triggering a reset of the updated module (120).

13. A method according to claim 12, comprising the further steps of incrementing a counter with each subsequent mismatch detection; and disabling module replicas (120$_{1-N}$) of the subsystem (150) when the counter reaches a predetermined number of mismatch occurrences.

14. A computer readable storage medium for storing computer readable instructions, the computer readable instructions being adapted to implement the steps of the method of claim 3.

15. A computer program or computer program product comprising software code adapted to perform the steps of the method of claim 3.

* * * * *